(12) United States Patent
Silverstein et al.

(10) Patent No.: US 8,218,235 B2
(45) Date of Patent: *Jul. 10, 2012

(54) PROJECTION DISPLAY SURFACE PROVIDING ARTIFACT REDUCTION

(75) Inventors: Barry D. Silverstein, Rochester, NY (US); Michael A. Marcus, Honeoye Falls, NY (US); Andrew F. Kurtz, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,111

(22) Filed: Sep. 20, 2011

(65) Prior Publication Data

US 2012/0008200 A1    Jan. 12, 2012

Related U.S. Application Data

(63) Continuation of application No. 12/816,559, filed on Jun. 16, 2010, now Pat. No. 8,085,467.

(51) Int. Cl.
*G03B 21/56* (2006.01)
*G03B 21/26* (2006.01)

(52) U.S. Cl. .................................. 359/443; 353/29
(58) Field of Classification Search .................. 359/443, 359/452–453, 459, 449; 353/29, 122; 345/55, 345/81, 84

See application file for complete search history.

(56) References Cited

U.S. PATENT DOCUMENTS

| | | | |
|---|---|---|---|
| 3,652,956 A | 3/1972 | Pinnow et al. | ................. 359/278 |
| 4,143,943 A | 3/1979 | Rawson | |
| 4,256,363 A | 3/1981 | Briones | |
| 5,313,479 A | 5/1994 | Florence | |
| 5,473,469 A | 12/1995 | Magocs et al. | |
| 5,757,124 A | 5/1998 | Pope | ............................. 313/495 |
| 6,122,023 A | 9/2000 | Chen et al. | |
| 6,323,984 B1 | 11/2001 | Trisnadi | |
| 6,445,487 B1 | 9/2002 | Roddy et al. | |
| 6,577,429 B1 | 6/2003 | Kurtz et al. | |
| 6,747,781 B2 | 6/2004 | Trisnadi | |
| 6,975,294 B2 | 12/2005 | Manni et al. | |
| 6,987,610 B2 | 1/2006 | Piehl | |
| 7,090,355 B2 | 8/2006 | Liu et al. | |
| 7,116,017 B2 | 10/2006 | Ji et al. | |
| 7,244,028 B2 | 7/2007 | Govorkov et al. | |
| 7,296,987 B2 | 11/2007 | Rossi et al. | |
| 7,304,795 B2 | 12/2007 | Yavid et al. | |
| 7,414,621 B2 | 8/2008 | Yavid et al. | |
| 7,474,286 B2 | 1/2009 | Hajjar et al. | |
| 7,515,336 B2 | 4/2009 | Lippey et al. | ................. 359/443 |

(Continued)

OTHER PUBLICATIONS

J. Goodman, "Speckle Phenomena in Optics, Theory and Application," Roberts and Company Publishers, Greenwood Village, CO (2007).

(Continued)

*Primary Examiner* — Christopher Mahoney
(74) *Attorney, Agent, or Firm* — Kevin E. Spaulding

(57) ABSTRACT

A projection display surface for reducing speckle artifacts from a projector having at least one narrow band light source having an incident visible wavelength band, wherein the incident visible wavelength band has an incident peak wavelength and an incident bandwidth, comprising: a substrate having a reflective layer that reflects incident light over at least the incident visible wavelength band; and a fluorescent agent distributed over the reflective layer, wherein the fluorescent agent absorbs a fraction of the light in the incident visible wavelength band and emits light in an emissive visible wavelength band having an emissive peak wavelength and an emissive bandwidth; wherein return light from the projection display surface produced when incident light in the incident visible wavelength band is incident on the projection display surface contains light in both the incident visible wavelength band and emissive visible wavelength band, thereby reducing speckle artifacts.

32 Claims, 16 Drawing Sheets

U.S. PATENT DOCUMENTS

| | | |
|---|---|---|
| 7,791,561 B2 | 9/2010 | Hajjar et al. .............. 345/32 |
| 2008/0048936 A1 | 2/2008 | Powell et al. |
| 2008/0172197 A1 | 7/2008 | Skipor et al. |
| 2008/0217602 A1 | 9/2008 | Kahen |
| 2008/0291140 A1 | 11/2008 | Kent et al. |
| 2009/0213330 A1 | 8/2009 | Silverstein et al. |
| 2009/0262308 A1 | 10/2009 | Ogawa |
| 2009/0284713 A1 | 11/2009 | Silverstein et al. |

OTHER PUBLICATIONS

Mooradian et al, "High power extended vertical cavity surface emitting diode lasers and arrays and their applications," Micro-Optics Conference, Tokyo, Japan (2005).

Ramanath, "Minimizing Observer Metamerism in Display Systems", Color Research & Application, vol. 34, pp. 391-398 (2009).

Barranco, et al., "Fluorescent Plasma Nanocomposite Thin Films Containing Nonaggregated Rhodamine 6G Laser Dye Molecules," Langmuir, vol. 22, pp. 6719-6722 (2006).

Dabbousi et al, "(CdSe)ZnS Core-Shell Quantum Dots: Synthesis and characterization of a size series of highly luminescent nanocrystallites," J. Phys. Chem. B 1997, vol. 101, 9463-9475 (1997).

López Arbeloa et al., "The fluorescence quenching mechanisms of Rhodamine 6G in concentrated ethanolic solution," Journal of Photochemistry and Photobiology A: Chemistry, vol. 45, pp. 313-323 (1988).

DYE OPTICAL DENSITY = 0.04
SPECKLE CONTRAST = 0.065

DYE OPTICAL DENSITY = 0.00
SPECKLE CONTRAST = 0.079

PROJECTION DISPLAY SURFACE PROVIDING ARTIFACT REDUCTION

CROSS-REFERENCE TO RELATED APPLICATIONS

This application is a continuation of U.S. patent application Ser. No. 12/816,559 filed Jun. 16, 2010, now U.S. Pat. No. 8,085,467 issued Dec. 27, 2011, which is incorporated herein by reference in its entirety.

Reference is made to commonly assigned, co-pending U.S. Patent Application Publication 2011/0310303 published Dec. 22, 2011, entitled: "Projection Apparatus Providing Reduced Speckle Artifacts", by Barry Silverstein et al., which is incorporated herein by reference.

FIELD OF THE INVENTION

The present invention relates generally to digital image projection and more particularly to a laser projector with a projection screen containing fluorescent materials to reduce the speckle noise in the displayed image.

BACKGROUND OF THE INVENTION

Laser illumination shows some promise for improving color gamut and achieving needed levels of brightness for digital projection apparatus, including digital projectors capable of providing cinema-quality imaging and pico-projectors offering portable projection for easier sharing of images. One recognized problem with projection systems using narrow band light sources, however, relates to speckle.

Speckle is a fine scale spatially varying intensity fluctuation that is caused by random roughness of optical surfaces on the order of a wavelength of light. The increased coherence of lasers introduces a significant effect in projection systems where the roughness creates randomly phased sub-sources, which interfere together. This random intensity fluctuation lowers the effective quality of an image, especially at the higher frequencies essentially producing a "shimmer effect" that masks fine details, but also creating an intensity sharpness that is really artificial.

The phenomenon of speckle has been studied in detail by many researchers and a comprehensive summary of knowledge has been published by Joseph Goodman in the book "Speckle Phenomena in Optics, Theory and Application" (Roberts and Company Publishers, Greenwood Village, Colo., 2007). Goodman suggests that full-frame displays should have speckle levels where the standard deviation of the intensity variation is less than the magnitude of the least significant bit of the intensity resolution of the modulation device. For Digital Cinema applications 12 bit intensity resolutions and contrast ratios of around 2000:1 are common. Other cinema standards lean toward different criteria, indicating that speckle "should not be visible", this can be quantitatively assumed to have the level of speckle to be equivalent to that of a white light projector on a common screen.

Speckle noise can be quantified in terms of speckle contrast, C, given in percent as:

$$C = 100 \left( \frac{I_{std}}{I_{mean}} \right) \quad (1)$$

wherein $I_{std}$ is a standard deviation of intensity fluctuation about a mean intensity $I_{mean}$. The speckle contrast for fully developed speckle is 100%. Speckle reduces the ability of an imaging system to resolve fine spatial detail and causes levels of noise in an image that can be highly visually annoying. At worst, without some form of correction, speckle can be sufficiently objectionable to render coherent illumination unsuitable for display purposes.

There have been a number of methods employed for reducing the visibility of speckle effects in imaging displays. Conventional strategies for speckle reduction include modifying the spatial or temporal coherence of the illumination, superimposing a number of uncorrelated speckle patterns onto each other, or modifying its polarization state. One method provides vibration or oscillatory movement of the display screen. With oscillation above a threshold speed, perceived speckle can be significantly reduced. Other methods include broadening the spectral line width of the laser illumination and reducing the spatial coherence by using static and oscillating diffusers or oscillating fibers or by vibrating various optical components in the path of illumination or imaging light.

Goodman has characterized some common approaches to reducing speckle in display applications:
1. Introduce polarization diversity;
2. Introduce a moving screen;
3. Introduce a specially designed screen that minimizes the generation of speckle;
4. For each color, broaden the spectrum of the sources or use multiple lasers at slightly different frequencies, thereby achieving wavelength diversity in the illumination;
5. For each color, use multiple independent lasers separated spatially, thereby achieving angle diversity in the illumination;
6. Overdesign the projection optics as compared with the resolution of the eye;
7. Image a changing diffuser with random phase cells onto the screen; and
8. Image a changing diffuser with deterministic or orthogonal phase codes onto the screen.

Each of these approaches has some benefits as well as negative attributes. Some of them apply well for high-end digital cinema projection, while others do not. In addition, in many cases a single approach may not be effective enough to reduce the speckle below acceptable thresholds. For example, polarization diversity is not desirable in many cases, as any projector that requires polarization either to modulate the light or to create stereoscopic imaging cannot allow impure states to reach the viewer. Specially designed screens that enable screen shaking can be effective, however, they require significant modification to the venue that is undesirable. Large screens are especially difficult to modify to enable screen shaking, as the equipment is large and expensive.

Spectrally broadening of the light sources can substantially reduce the level of speckle, however, this may be difficult to control in the laser fabrication, as many methods of creating visible solid state sources desired for display applications use frequency double crystals that control the wavelength to around 1 nm.

Multiple independent lasers can be a very good approach, but depends on the number of elements used to control the speckle. This does not work well over the entire range from low-light-level to high-light-level projection system, as a 1000 lumen projector needs to be as speckle free as a 10,000 lumen projector, yet the number of sources may be 10 times as high. For example, Mooradian et al, disclose improved speckle performance when using Novalux Extended Cavity Surface Emitting Lasers (NECSELS), in the article "High power extended vertical cavity surface emitting diode lasers and arrays and their applications" (Micro-Optics Conference, Tokyo, Japan, 2005). In this case 30 to 40 independent (incoherent to each other) emitters reduced the speckle down to several percent. While the speckle is reduced with larger number of emitters it is not always reduced to white light levels required by the stringent digital cinema requirements.

In U.S. Pat. No. 7,296,897, Mooradian et al., entitled "Projection display apparatus, system, and method," discloses individual and combined techniques to reduce laser speckle similar to those described by Goodman. First increasing the number of lasers that are substantially incoherent with respect to each other. Second, spectral broadening of the lasers may be used. (This technique is also described in U.S. Pat. No. 6,975,294 to Manni et al.) Third, individual lasers in an array may be designed to operate with multiple frequencies, phase, and directional (angular) distributions. Finally an optical element may be used to scramble the direction, phase and polarization information. As described earlier, increasing the number of lasers is effective at reducing speckle, however the effect is incomplete. The additional methods described are generally difficult to implement, expensive or undesirable optically.

U.S. Pat. No. 7,244,028 to Govorkov et al., entitled "Laser illuminated projection displays," describes the use at least one laser delivered to a scanning means that increases the laser beam divergence temporally into a lens that delivers the light to a beam homogenizer that illuminates a spatial light modulator. This reduces the laser speckle to acceptable levels when combined with a screen that has at least one feature to further reduce speckle. Temporally varying the laser beam divergence is generally a good means of reducing speckle, however it too requires the modification of the screen for complete speckle reduction. This is undesirable for general projection purposes.

U.S. Pat. No. 7,116,017 to Ji et al., entitled "Device for reducing deterioration of image quality in display using laser," describes a specific device consisting of a vibrating mirror in the light path between the laser and the screen. This alone will not reduce speckle to acceptable levels. Commonly assigned U.S. Pat. No. 6,445,487 to Roddy et al., entitled "Speckle suppressed laser projection system using a multi-wavelength Doppler shifted beam," describes methods that use frequency modulation of the lasers in conjunction with a device to deviate the beam angularly in time. This method requires laser modulation that may not be practical or possible for all laser sources. Similarly the application focuses on using an acousto-optic modulator for angular deviation. These devices are very expensive and can only handle certain laser types and sizes.

Numerous methods for reducing speckle have been described in the prior art. U.S. Pat. No. 6,747,781 to Trisnadi et al., entitled "Method, apparatus, and diffuser for reducing laser speckle," discloses moving a diffusing element that is positioned at an intermediate image plane that subdivides image pixels into smaller cells having different temporal phase. Commonly-assigned U.S. Pat. No. 6,577,429 entitled "Laser projection display system" to Kurtz et al. discloses using an electronically controllable despeckling modulator to provide controllable, locally randomized phase changes with a linear SLM. U.S. Pat. No. 6,323,984 entitled "Method and apparatus for reducing laser speckle" to Trisnadi et al. discloses speckle reduction using a wavefront modulator in the image plane. U.S. Pat. No. 5,313,479 entitled "Speckle-free display system using coherent light" to Florence discloses illumination of a light valve through a rotating diffuser. U.S. Pat. No. 4,256,363 to Briones, entitled "Speckle suppression of holographic microscopy," and U.S. Pat. No. 4,143,943 to Rawson, entitled "Rear projection screen system," each disclose apparatus that reduce speckle by moving diffusive components that are within the projection path. Commonly-assigned U.S. Patent Application Publication 2009/0284713 to Silverstein, et al., entitled "Uniform speckle reduced laser projection using spatial and temporal mixing," teaches using a temporally varying optical phase shifting device in the optical path to reduce speckle in a digital cinema system.

While conventional methods for speckle reduction may have some applicability to laser-based projection systems, there are drawbacks to these approaches that constrain image quality and reduce overall contrast as well as adding cost and complexity to projection apparatus. Any type of modification to components in the imaging path, for example, can require significant redesign, can complicate component packaging, and risks the introduction of noise or vibration into optical and signal paths of projector components.

The problem of speckle reduction is further complicated because different types of spatial light modulators (SLMs) are being used for digital projection. Three types of SLMs are used in practice: point-scan, line-scan and frame-by-frame. Point-scan projectors display an image by raster scanning a single pixel at a time. A number of projectors use grating light valves (GLVs) or grating electromechanical systems (GEMS) that generate images using diffractive gratings that have tiny mechanical members that are variably actuated in order to form an image. The image from such a device is scanned onto the display surface, a single line at a time. These modulators are advantaged with respect to simplicity and cost, and therefore are desirable for use in consumer devices such as pico-projectors. However, they present problems due to the energy density that can be delivered which limits the amount of light that can safely be projected. Other projectors employ reflective or transmissive liquid-crystal devices (LCDs). These SLMs project a complete image frame at a time. Still other projection apparatus use digital micromirror devices with two-dimensional arrays of micro-electromechanical reflectors, such as the Digital Light Processor (DLP) from Texas Instruments, Inc., Dallas, Tex. DLP devices similarly form a complete image frame at a time. These area-type devices are advantaged in delivering less energy density to the screen offering safer operation. Because images are formed in different ways using these different SLMs and projection technologies, solutions that compensate for speckle with one type of SLM may not be as effective when used in a projector that uses a different type of SLM for forming images.

A number of different approaches have been developed which use specially designed screens to reduce speckle. U.S. Pat. No. 6,122,023 to Chen et al., entitled "Non-speckle liquid crystal projection display," discloses a projection screen which includes a liquid crystalline material. When driven with an AC voltage the liquid crystalline materials vibrate slightly which causes the speckle pattern to change quickly which causes the observed speckle noise by the viewer to be reduced.

U.S. Pat. No. 7,304,795 to Yavid and Stern, entitled "Image Projection with Reduced Speckle Noise," discloses a projection screen which includes a plurality of optical resonator cavities which trap incident laser light for a time greater than the coherence time and for generating a time varying interference pattern in which speckle noise is reduced.

U.S. Pat. No. 5,473,469 to Magocs and Baker, entitled "Front projection screen with lenticular front surface," discloses a front projection screen for use with a laser projector which includes a lenticular lens array on the front surface of the screen which incorporates light scattering particles to form a diffusion region and a reflector on its back surface. Since incident light rays traverse different portions of the diffusion region in different directions which increases the likelihood that the ray will incorporate a scattering particle, speckle noise is reduced.

The use of projection screens incorporating color changing materials is described in the following art. U.S. Pat. No. 7,414,621 to Yavid et al., entitled "Method and Apparatus for Controllably Producing a Laser Display," discloses a raster scanned laser display for projecting an image on a screen incorporating at least one phosphor at the screen for reflecting light with a wavelength different from the wavelength of the incident laser beam which emits light in the ultra-violet or IR wavelength region of the spectrum. Complete absorption of the laser beam is required by the phosphor in order to fully utilize this approach.

U.S. Pat. No. 6,987,610 to Piehl, entitled "Projection Screen," discloses a projection screen comprising a substrate having thereon one or more fluorescent materials that emit visible light with an incidence of one or more ranges of visible light and absorb visible light in at least one other range of wavelengths that is not included in the one or more ranges and one or more absorption materials disposed between the substrate and the one or more fluorescent materials that reflect wavelengths of light in the one or more ranges and absorb wavelengths of light that are not included in the at least one other range nor in the one or more ranges.

U.S. Patent Application Publication 2008/0172197 to Skipor et al., entitled "Single laser multi-color projection display with quantum dot screen," discloses a display comprising a passive screen printed with a pattern of different color quantum dots that is excited by raster scanning a single UV laser beam over the screen.

U.S. Pat. No. 7,474,286 to Hajjar et al., entitled "Laser Displays using UV-Excitable Phosphors Emitting Visible Colored Light," discloses a display system using at least one scanning laser beam to excite one or more fluorescent materials on a screen in the form of parallel phosphor stripes which emit light to form images. An alignment verification sensor is also required to verify that the laser light modulation timing is correctly aligned with the phosphor stripes during raster scanning of the laser over the screen surface. In a related disclosure, U.S. Patent Application Publication 2008/0291140 to Kent et al., entitled "Display Systems Having Screens with Optical Fluorescent Materials," further teaches that the fluorescent materials may include phosphor materials or quantum dots.

U.S. Patent Application Publication 2008/0048936 to Powell et al., entitled "Display and display screen configured for wavelength conversion," discloses a display screen including an array of couplets containing a wavelength converting material. The couplets are configured to receive light at a first wavelength and responsively emit light at a second wavelength preferentially in a direction.

U.S. Patent Application Publication 2009/0262308 to Ogawa, entitled "Light source unit and projector," discloses a projector, which includes first and second light sources comprising light emitting diodes or a solid-state light emitting devices for emitting light in each of two predetermined wavelength bands and a third light source formed by a phosphor which transmits light of the first light source and absorbs light emitted from the second light source. In this case there is no phosphor material on the screen.

Thus, it can be appreciated that speckle presents a recurring problem that must be addressed in projection apparatus design when laser illumination is used. Conventional speckle compensation approaches add cost and complexity to projector design, and generally reduce image quality with respect to projector output. There is, then, a need for a speckle compensation mechanism that can be used for a broad range of imaging technologies and that does not impact projector design.

SUMMARY OF THE INVENTION

It is an object of the present invention to advance the art of digital image projection. With this object in mind, an embodiment of the present invention is characterized by a projection display surface for reducing speckle artifacts from a projector having at least one narrow band light source having an incident visible wavelength band, wherein the incident visible wavelength band has an incident peak wavelength and an incident bandwidth, comprising:

a) a substrate having a reflective layer that reflects incident light over at least the incident visible wavelength band; and b) a fluorescent agent distributed over the reflective layer, wherein the fluorescent agent absorbs a fraction of the light in the incident visible wavelength band and emits light in an emissive visible wavelength band having an emissive peak wavelength and an emissive bandwidth; wherein the emissive bandwidth is wider than the incident bandwidth and is at least five nanometers in width;

wherein return light from the projection display surface produced when incident light in the incident visible wavelength band is incident on the projection display surface contains light in both the incident visible wavelength band and emissive visible wavelength band, thereby reducing speckle artifacts by the mechanism of spectral broadening.

The apparatus of the present invention has the advantage that it is independent of the image-forming technology that is used within the projector. It is equally well-suited for use with projection systems that use spatial light modulators that scan a linear image onto the display surface as well as for projection systems that form a complete two-dimensional image at a time.

It has the additional advantage that it does not add any cost or complexity to the projection apparatus itself.

It is a further advantage of the present invention that it reduces speckle with little perceptible impact on image quality.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

For the detailed information that follows, it is to be understood that elements not specifically shown or described may take various forms well known to those skilled in the art. Figures shown and described herein are provided to illustrate key principles of operation and component relationships along their respective optical paths according to embodiments of the present invention and may not show actual size or scale. Some exaggeration may be necessary in order to emphasize basic structural relationships or principles of operation.

Embodiments of the present invention address the problem of speckle reduction by adapting the response of a display screen or other type of display surface to incident narrow band light from a projector. By redistributing a portion of the incident light energy to emissive materials on the display screen surface, embodiments of the present invention effectively expand the spectral bandwidth of the displayed image, thereby reducing speckle artifacts with little or no perceptible impact on brightness and color quality.

Figure 1:
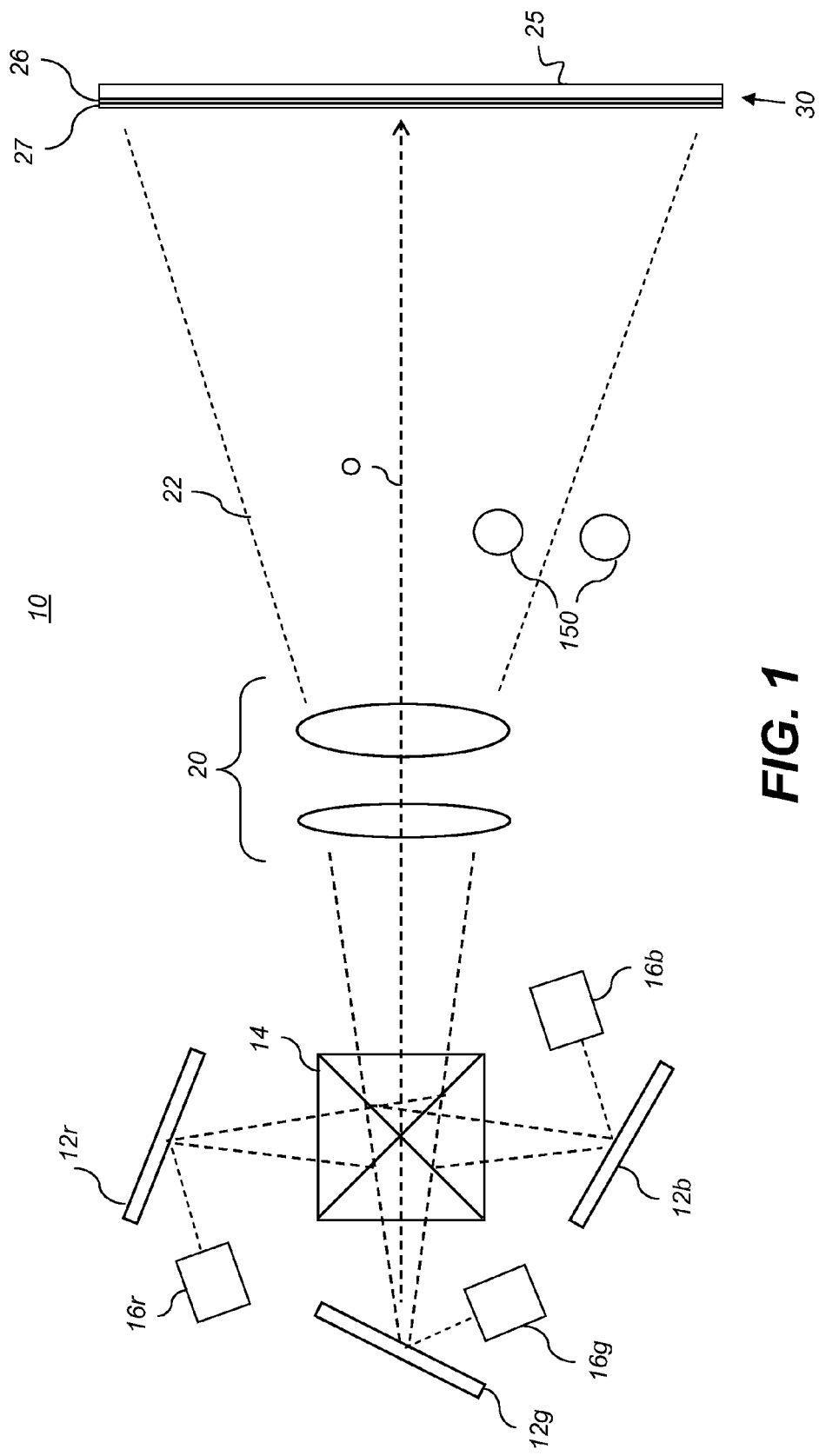
FIG. 1 is a simplified block diagram of a digital projection apparatus using the projection display surface of the present invention.

The simplified schematic of FIG. 1 shows one type of a projection apparatus 10 with a projection lens 20 that projects a light beam 22 to form an image on a display surface 30, having a reflective layer 26 provided on a substrate 25. In some embodiments, the substrate 25 is made of a reflective material. In this case, the reflective layer 26 can be the top surface of the substrate. Viewers 150, who are positioned underneath light beam 22, can view the projected image on display surface 30. Depending on their distance from the screen and other factors, they may also perceive speckle artifacts and other image artifacts such as metameric failure artifacts.

The projection apparatus 10 has three or more color channels, typically red (R), green (G) and blue (B). Each color channel has a narrow band light source, 16r, 16g and 16b, and a corresponding spatial light modulator 12r, 12g and 12b, respectively. In a preferred embodiment, the spatial light modulator 12r, 12g, and 12b are digital micro-mirror devices, such as the well known Digital Light Processor (DLP) spatial light modulators available from Texas Instruments, Inc. of Dallas, Tex.

Modulated light from each of three or more color channels is combined onto the same optical path, optical axis O, using a combining element such as a dichroic combiner 14. This same basic model also applies for an LCD or other type of spatial light modulator used with such a system, with a different orientation of the LCD modulator relative to its coherent light source.

Figure 2:
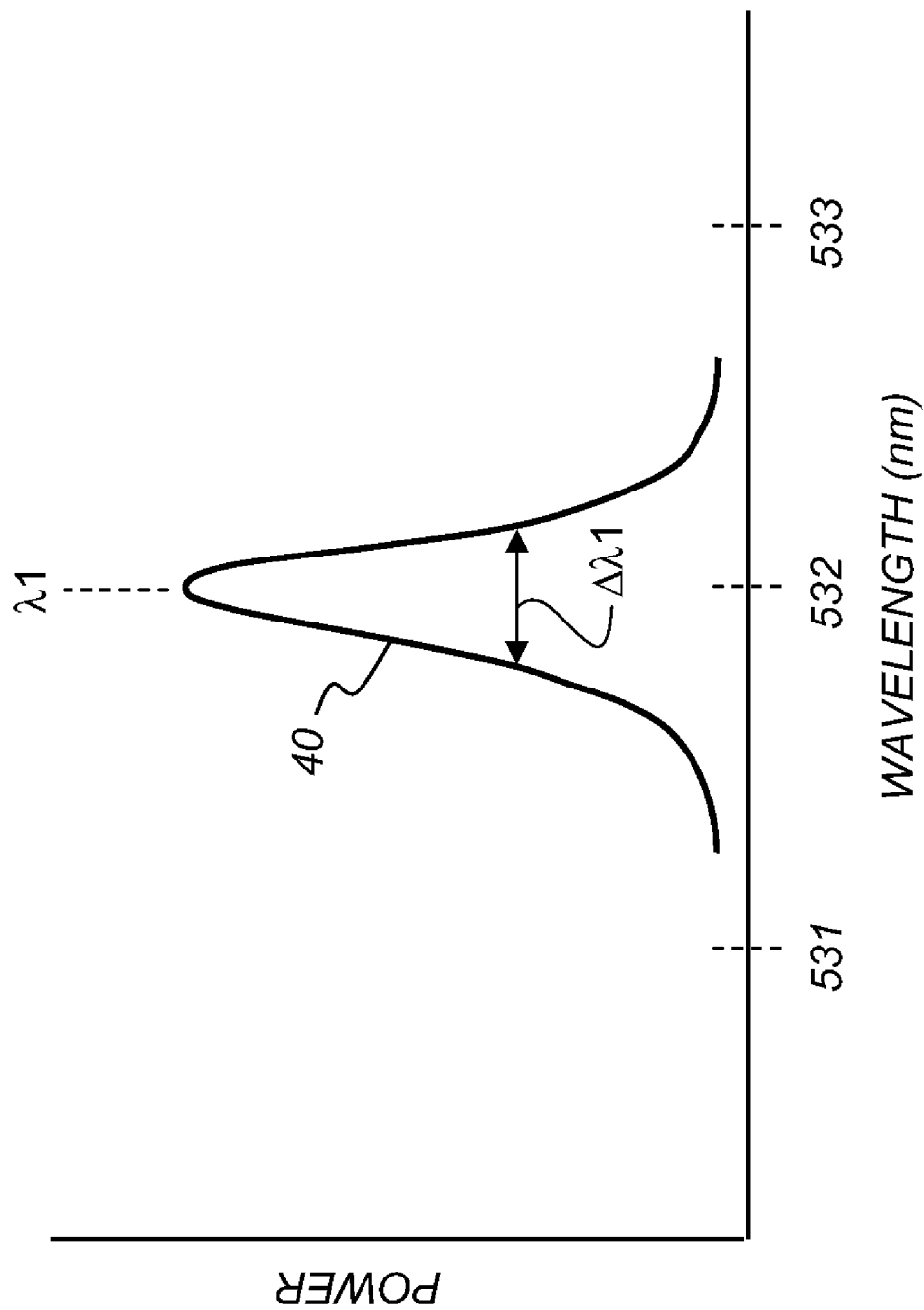
FIG. 2 is a graph showing an example emission spectrum for a single color channel in the digital projection apparatus.

Each light source 16r, 16g and 16b is a narrow-band light source (such as a laser light source or an LED light source) having a visible wavelength band characterized by a peak wavelength and a bandwidth providing some amount of energy over a small range of nearby wavelengths. The graph of FIG. 2 illustrates a wavelength band 40 corresponding to the emission spectrum of a representative laser used as an illumination source in a digital projector, such as that shown in FIG. 1. In this example, the laser is shown as a Green laser, having peak wavelength $\lambda 1$ of 532 nm, but having energy at wavelengths that are slightly to each side of this central value. The width of the wavelength band 40 is characterized by a bandwidth $\Delta\lambda 1$ (e.g., the full-width half maximum bandwidth). This same basic relationship also applies for Red and Blue lasers, over their corresponding wavelength bands. Typical laser bandwidths used in laser projectors are in the range of 0.05-0.50 nm.

This high concentration of light over a very narrow wavelength band has advantages for providing a broad color gamut. However, because the laser light is highly coherent, this same narrow-band characteristic is also a factor that contributes to the formation of perceptible speckle in the displayed image. Speckle can be reduced by increasing the spread of light energy over the spectrum. The approach of the present invention attempts to broaden this energy distribution in a controllable manner, without unduly compromising image quality.

In the present invention, this broadening of the energy distribution is achieved by conditioning the response of the display screen (display surface 30 in the system of FIG. 1) to incident light. This conditioning of the screen can be achieved in a number of ways. In one embodiment, a fluorescent agent 27 such as a fluorescent dye is distributed over the reflective layer 26 of the display surface 30 provides this spectral broadening function, supplementing the reflective properties of the reflective layer 26.

Fluorescent dyes are materials that absorb light energy at a first wavelength and, in response to this absorbed energy, emit light energy at a second wavelength that is spectrally shifted from the first wavelength. Fluorescent dyes are useful, for example, for locating and tracing various biochemical substances in molecular imaging applications. These applications use the fluorescent dye response known as Stokes shift. Stokes shift relates to the difference in wavelength in fluorescence response between the transmitted and partially absorbed first light energy at $\lambda 1$ and the emitted second light energy $\lambda 2$.

For biomedical imaging applications, highly selective filters are used in order to separate incident light wavelengths of the excitation light from fluorescent light wavelengths. To help further facilitate this separation, researchers use materials that fluoresce at wavelengths that are markedly higher than the excitation wavelength. For the purposes of the present invention, however, only a slight shift in wavelength due to the Stokes shift is desirable.

Figure 3:
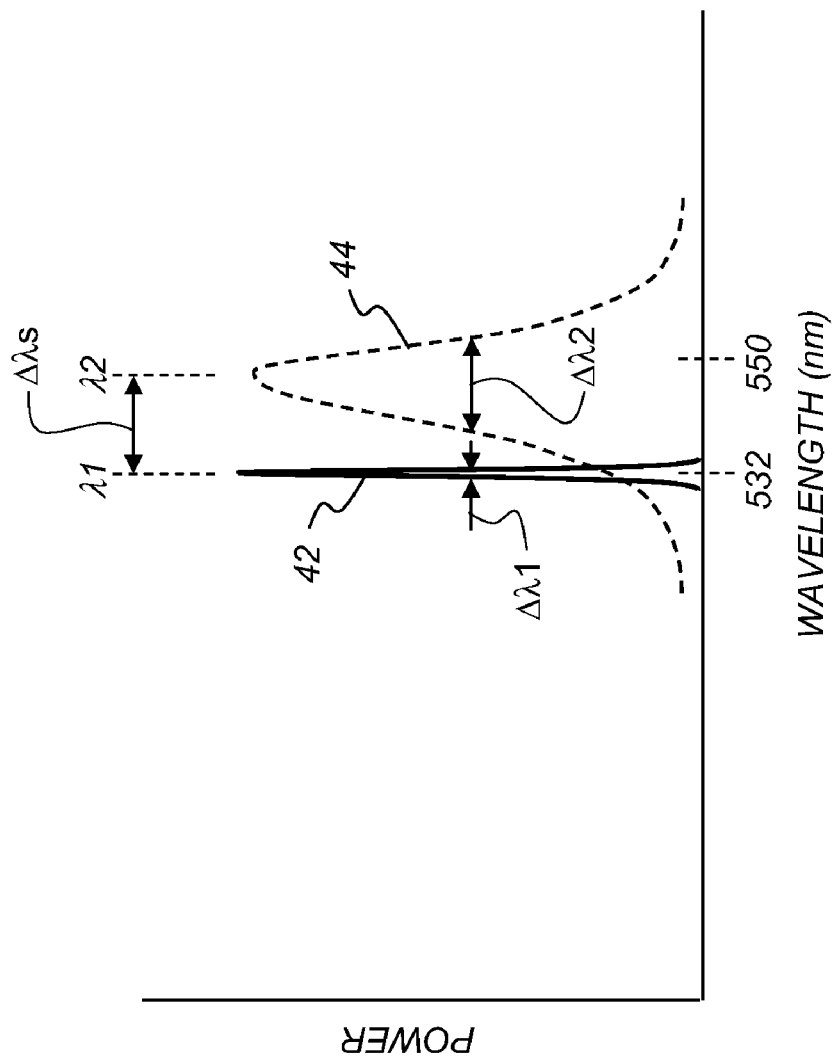
FIG. 3 is a graph showing an idealized example of a fluorescent emissive wavelength band produced by absorbing light in an incident wavelength band.

Referring to FIG. 3, the phenomenon of low Stokes shift for one type of fluorescent dye is shown. Incident visible light in an incident wavelength band 42 having an incident peak wavelength $\lambda 1$ and an incident bandwidth $\Delta\lambda 1$ is absorbed by the fluorescent dye. The fluorescent dye then emits light in an emissive wavelength band 44 having an emissive peak wavelength $\lambda 2$ and an emissive bandwidth $\Delta\lambda 2$. The emissive peak wavelength $\lambda 2$ is shifted relative to the incident peak wavelength $\lambda 1$ by a Stokes shift $\Delta\lambda s$. In accordance with the present invention, both the incident wavelength band 42 and the emissive wavelength band 44 will generally be in the visible wavelength range, which extends from approximately 400-700 nm.

In a low Stokes-shift condition, such as that represented in FIG. 3, the amount of the Stokes shift $\Delta\lambda s$ between $\lambda 1$ and $\lambda 2$ can be as low as a few nm. In the context of the present invention, for broadening the energy distribution of perceived light in order to reduce speckle, a shift of less than about 40 nm works well. A more preferable Stokes shift would be at a smaller value, such as a shift of less than about 20 nm or less than about 10 nm. This amount of color shift that results can be imperceptible to the viewer of the projected image. Further, since the emissive wavelength band 44 typically has an extended tail, keeping the spectral shift smaller reduces undesirable residual light that may overlap into a neighboring color spectrum. But, because of the slight frequency difference between the original laser light and the emitted light that is excited, speckle artifacts in the on-screen image are reduced.

Preferably, the emissive bandwidth $\Delta\lambda 2$ is wider than the incident bandwidth $\Delta\lambda 1$ and is at least 5 nm in width and no more than about 50 nm in width. The wider bandwidth is helpful to provide speckle reduction by spectral broadening.

Exemplary dyes usable for the present invention include Alexa Fluor® Dyes from Life Technologies Corporation, Carlsbad, Calif. For the Green color channel, for example, Alexa Fluor 532 dye has an absorption peak wavelength $\lambda 1$ at 532 nm and an emission peak wavelength $\lambda 2$ at about 555 nm.

The amount of the fluorescent agent 27 distributed over the reflective layer 26 can be adjusted to control the amount of light in the incident wavelength band 42 that is absorbed and produces emitted light in the emissive wavelength band. Generally, it will be desirable to use a relatively low amount of the fluorescent agent 27 such that only a fraction of the incident light is absorbed such that the return light from the display surface 30 contains both light in the incident wavelength band 42 that is reflected from the reflective layer 26 and light in the emissive wavelength band 44 that is emitted by the fluorescent agent 27.

While the previously mentioned references by Piehl (U.S. Pat. No. 6,987,610), Skipor et al. (U.S. Patent Application Publication 2008/0172197), Hajjar et al. (U.S. Pat. No. 7,474,286), Kent et al. (U.S. Patent Application Publication 2008/0291140) and Powell et al. (U.S. Patent Application Publication 2008/0048936) each teach the use of display screens including fluorescent agents, that there are several important differences between the present invention and the prior art configurations. In each of these references, the purpose of the fluorescent agent is to change the color of the incident light into a new color. In some cases, invisible ultraviolet radiation is converted to visible light. In contrast, the method of the present invention provides return light that is shifted by only a small interval relative to the incident light. Preferably, the magnitude of the shift is small enough such that the incident light and the return light would be perceived by a human observer to have the same color name (e.g., "red," "green" or "blue").

Furthermore, in the prior art references the fluorescent agents are designed to absorb substantially all of the incident laser light so that the return light contains only emissive light. In contrast, the return light in the present invention contains light in both the incident wavelength band 42 and the emissive wavelength band 44. This feature is useful to produce spectral broadening in order to reduce the visibility of speckle artifacts. None of the prior art projection screens teach configurations that provide speckle reduction.

The example of FIG. 3 illustrates applying the method of the present invention to provide speckle reduction for a green color channel having a green narrow-band light source. In some configurations, significant reductions in the visibility of speckle artifacts can be achieved by using a single fluorescent agent to provide spectral broadening for only a single color channel (i.e., the green color channel or some other color channel). For example, speckle artifacts are often more visible in one color channel more than the other color channels. Therefore, reducing the speckle artifacts in that color channel can provide significant image quality improvements even if no speckle reduction is provided for the other color channels.

In other configurations, the same speckle reduction principle can be applied for a plurality of color channels by distributing multiple fluorescent agents over the reflective layer. For example, a red fluorescent agent that absorbs light in the red incident wavelength band and emits light in a corresponding red emissive wavelength band can be distributed over the reflective layer together with the green fluorescent agent. Alternately, multiple fluorescing agents 27 can be distributed over the display surface 30 to operate on a given color channel. For example, two fluorescent agents 27, one with a small positive Stokes shift, and the other with a small negative (anti-Stokes) shift could provide spectral broadening on either side of the incident wavelength band 42.

The characteristic response shown in FIG. 3 is idealized and represents the power of the excited fluorescent energy at a level approximately equal to that of the initial excitation beam. In practice, such a balanced relationship is not needed; what is useful is obtaining sufficient fluorescence to slightly broaden the spectral distribution of the color light so that speckle artifacts are eliminated, or at least reduced to imperceptible levels.

Figure 4:
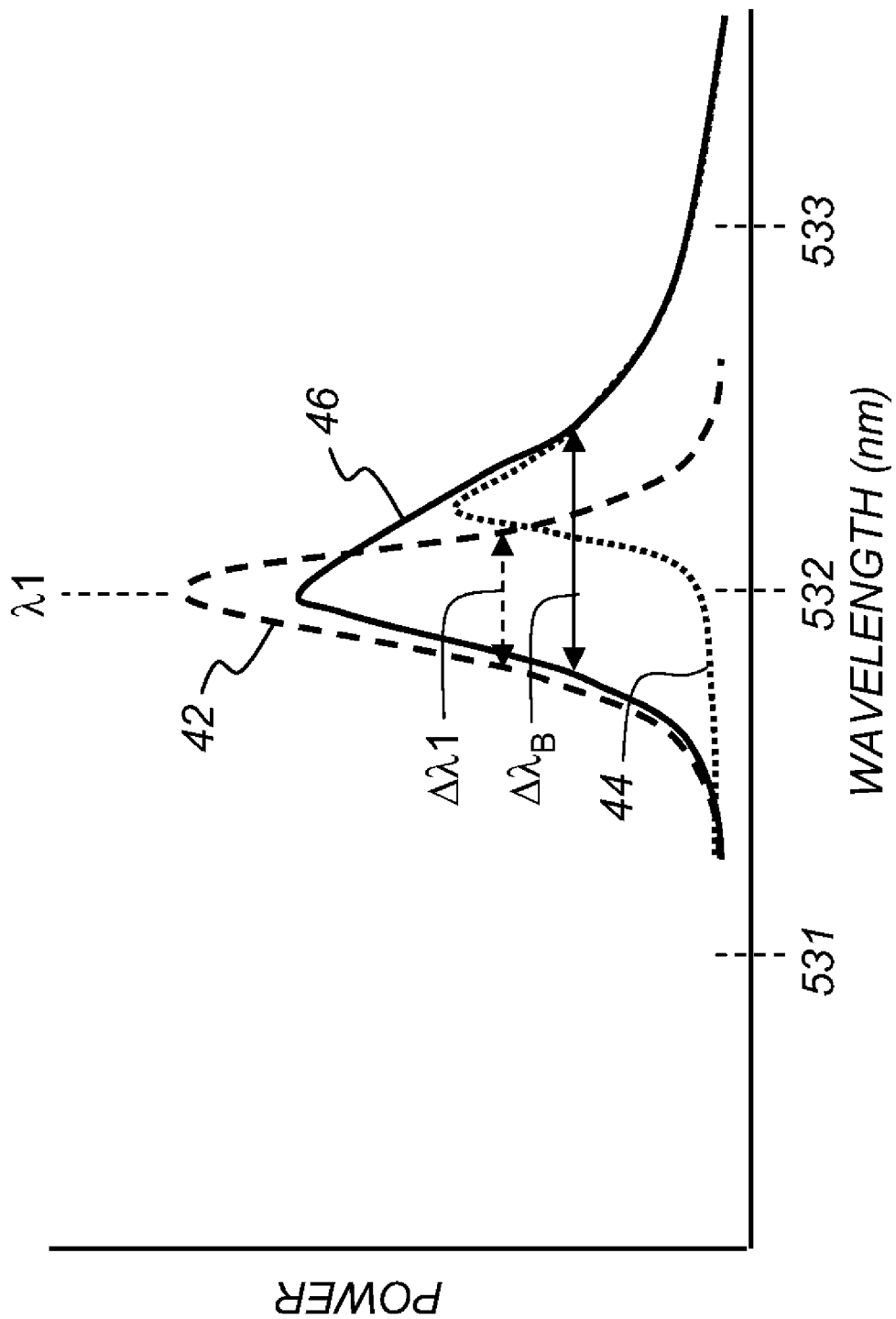
FIG. 4 is a graph showing an idealized return light spectrum resulting from a small Stokes shift.

It is not necessary that the return light have two distinct peak wavelengths as was shown in the example of FIG. 3. For example, FIG. 4 shows an idealized example where an incident wavelength band 42 stimulates an emissive wavelength band 44 have a relatively small Stokes shift. Additionally, the power of the return light in the emissive wavelength band is smaller than the power of the return light in the incident wavelength band 42. In this case, a resulting return light wavelength band 46 has the same peak wavelength $\lambda 1$ as the incident wavelength band 42, but has a broadened spectrum with a broadened bandwidth of $\Delta\lambda_B$. An advantage of this arrangement is that the color shift of the return light will be much smaller than that for the example of FIG. 3.

The fluorescent agent (e.g., the fluorescent dye) can be applied to the surface of a projection screen in a number of ways. For example, a fluorescent dye can be dispersed or suspended within an applied coating. A number of practical observations apply for the use of a fluorescent dye in this manner:

(i) The dye molecules will generally be much smaller (nm scale) than the pixel size (mm scale) on the display screen. Therefore, dispersion of the fluorescent dye molecules as particulates or in a suspension enables the application of the fluorescent dye onto the display screen surface at suitable concentrations without affecting the image resolution.

(ii) In one embodiment, a separate fluorescent dye is applied to the projection screen surface for each of the color channels (e.g., red green, and blue). The different fluorescent dyes can be combined and applied as part of the same coating. Alternately they can be applied in separate coatings. In alternate embodiments, a fluorescent dye is applied for a single color channel only (e.g., green) and no conditioning of the projection screen is provided for the other color channels (e.g., blue and red). It can be appreciated that various combinations of conditioning for this purpose can be used, including treatment for any one, any two, or all three color channels. For four-color projection systems, even more permutations are possible.

(iii) Relatively low amounts of fluorescent dye are typically required in order to provide the needed effect. For example, a dye concentration sufficient to absorb about 10% of the light in the incident wavelength band has been found to provide substantial speckle reduction in a typical configuration. Generally, the concentration of the fluorescent dye should be chosen to absorb between 2% and 40% of the light in the incident wavelength band. The optimum concentration of the fluorescent dyes for each color channel will be a function of a number of factors including the speckle visibility of the color channel and the degree of spectral broadening provided by the Stokes shift for a particular fluorescent dye.

(iv) Where the fluorescent dye is applied onto an existing screen formulation, some type of added coating protection may be useful to provide durability. In one embodiment, an overcoat layer (e.g., a polymer overcoat) is provided over the top of the fluorescent agent 27 (FIG. 1) to provide protection for the fluorescent agent. Preferably, the material that is used for the overcoat layer should not exhibit perceptible birefringence. In alternate embodiments, the fluorescent agent 27 can be suspended within the overcoat layer. The overcoat layer is generally used to protect the fluorescent dye from environmental concerns. In some cases, the overcoat layer may also be doped or coated with an ultraviolet light blocker to provide further protection for the fluorescent dyes.

In general, fluorescent agents emit light that is at a lower energy (i.e., at a longer wavelength) than the excitation energy. This relationship is shown in FIG. 3, for example. There are also fluorescing materials for which the emitted energy is at a lower wavelength. This type of response has been termed "anti-Stokes" shift. Materials that exhibit this type of response could alternately be used for embodiments of the present invention.

Examples of fluorescent dyes that are suitable for use with projected light in a red color channel include those given in Table 1. Generally, a fluorescent dye should be selected where the peak absorption wavelength is closely matched to the emissive peak wavelength for the narrow-band light source. Similarly, examples of fluorescent dyes that are suitable for use with a green color channel include those given in Table 2, and examples of fluorescent dyes that are suitable for use with a blue color channel include those given in Table 3.

TABLE 1

Example fluorescent dyes for use with a red color channel.

| Fluorescent Dye | Peak Absorption Wavelength (nm) | Peak Emission Wavelength (nm) |
| --- | --- | --- |
| BODIPY 630/650 | 625 | 640 |
| BODIPY 650/665 | 646 | 660 |
| Alexa Fluor 633 | 632 | 647 |
| Alexa Fluor 635 | 633 | 647 |
| Alexa Fluor 647 | 650 | 668 |

TABLE 2

Example fluorescent dyes for use with a green color channel.

| Fluorescent Dye | Peak Absorption Wavelength (nm) | Peak Emission Wavelength (nm) |
| --- | --- | --- |
| Alexa Fluor 500 | 503 | 525 |
| Alexa Fluor 514 | 518 | 540 |
| Alexa Fluor 532 | 531 | 554 |
| BODIPY R6G | 528 | 550 |
| BODIPY 530/550 | 534 | 554 |
| BODIPY TMR | 542 | 574 |
| 4',5'-Dichloro-2',7'-dimethoxy-fluorescein | 522 | 550 |
| 2',7'-Dichloro- fluorescein | 510 | 532 |
| Eosin | 524 | 544 |
| Erythrosin | 530 | 555 |
| Oregon Green 514 | 511 | 530 |
| Rhodamine 6G | 525 | 555 |
| Rhodamine Green dye | 502 | 527 |
| 2',4',5',7'-Tetrabromosulfone-fluorescein | 528 | 544 |
| 2',4,7,7'-Tetrachlorofluorescein, succinimidyl ester (TET) | 521 | 536 |
| EYFP (enhanced yellow fluorescent protein) | 512 | 529 |

TABLE 3

Example fluorescent dyes for use with a blue color channel.

| Fluorescent Dye | Peak Absorption Wavelength (nm) | Peak Emission Wavelength (nm) |
| --- | --- | --- |
| Dialkylaminocoumarin | 435 | 475 |
| Sytox blue | 445 | 475 |
| Pacific Blue dye | 410 | 455 |
| Alexa Fluor 405 | 402 | 421 |
| Cascade Blue | 400 | 420 |

Figure 5:
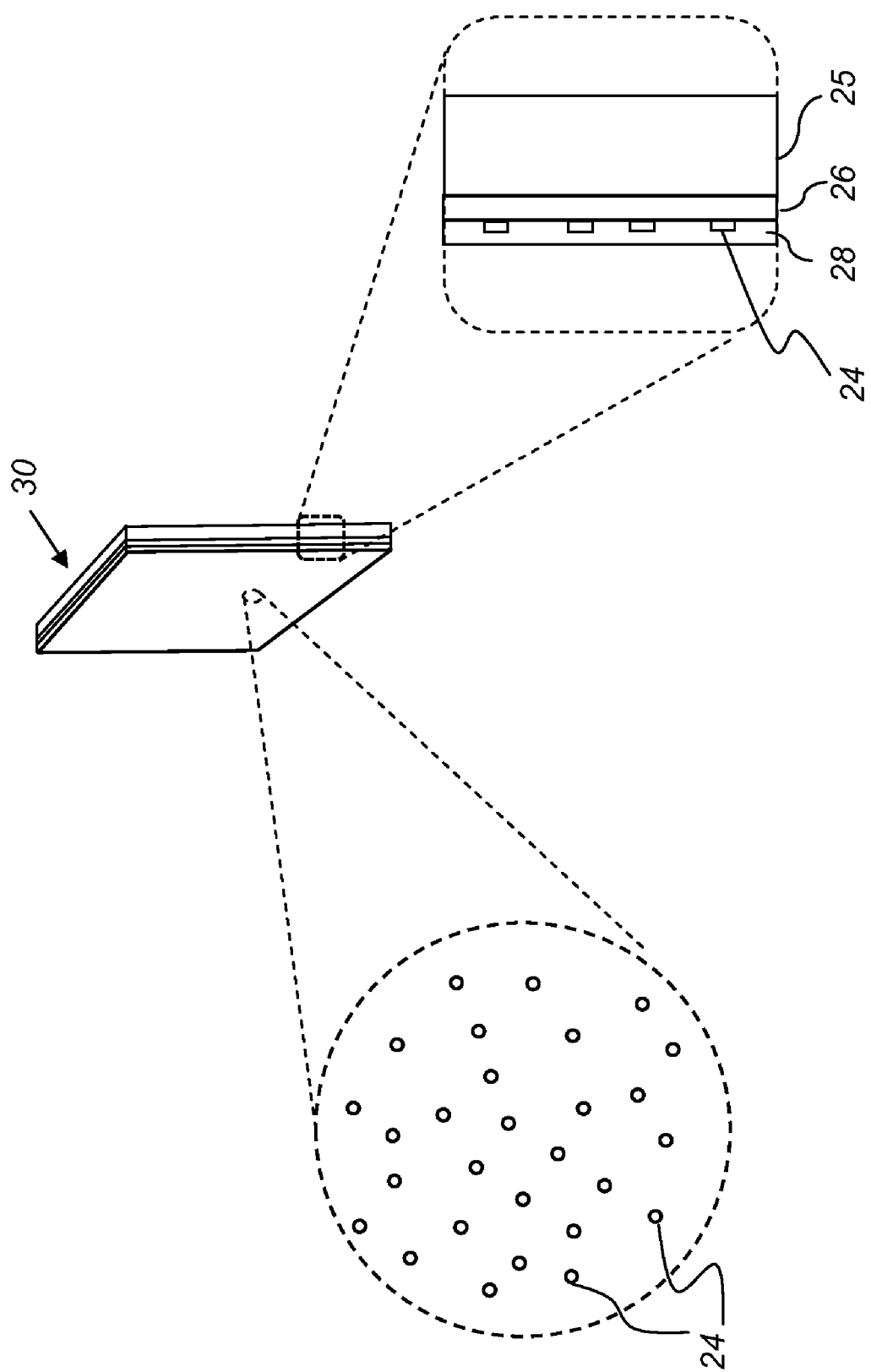
FIG. 5 is a diagram showing enlarged front and side views of a display surface conditioned with a sparsely distributed fluorescing agent.

FIG. 5 is a diagram showing enlarged front and side views of a display surface 30 conditioned with a fluorescent agent 27 according to an alternate embodiment. In this case, the fluorescent agent is distributed over a reflective layer 26 on a substrate 25 in a patterned fashion of sparsely and randomly distributed fluorescent dots 24. Alternatively, the fluorescent dots 24 could also be arranged in a more uniformly ordered matrix. The reflective layer 26 reflects the incident light as in a conventional film projection surface. An optional protective coating 28 is also shown encapsulating the fluorescent dots 24. In the context of the present invention, a sparse distribution of fluorescent dots is an arrangement in which individual fluorescent dots 24 do not interact with each other. This implies that the fluorescent dots 24 cover no more than about 40% of the display surface 30. (Similarly, when the fluorescent agent 27 is applied in a uniform coating, a sparse coating of the fluorescent agent 27 will be defined to be one where there is no aggregation of fluorescent agent molecules.)

The number and density of the fluorescent dots 24 can be selected to achieve the desired level of absorption of the light in the incident wavelength band (generally between 2% and 40%). For example, if the fluorescent dots 24 were sufficiently dense so as to absorb virtually all of the light in the incident wavelength band, and if it were desired to absorb 9% of the incident light, then the number of fluorescent dots 24 should be chosen to cover 9% of the surface area of the display surface 30.

For configurations where multiple fluorescent agents are used to provide spectral broadening for a plurality of color channels, each fluorescent dot 24 can have a single fluorescent agent. Alternately, each fluorescent dot 24 can include a combination of the fluorescent agents. Generally, it will be desirable that the size of the fluorescent dots 24 are small relative to the size of a projected pixel so that every pixel will produce return light having both reflected incident light and emissive light. The fluorescent dots 24 are shown to be round dots in this example, but they could be formed using any convenient shape.

The size and number of fluorescent dots 24, as well as the concentration of the fluorescent agent in the fluorescent dots 24, can be adjusted to control the relative amounts of reflected incident light and emissive light in the return light. In one embodiment of the FIG. 5 configuration, the fluorescent agent 27 is applied in a high concentration such that the majority of the light in the incident wavelength band that falls on the fluorescent dots 24 is absorbed and used to stimulate emissive light in the emissive wavelength band.

To test the speckle reduction characteristics for projection screens formed according to the method of the present invention, sample screens were formed based on a Hurley Screen MW-16 screen material. Hurley Screen MW-16 material is a heavy gauge titanium dioxide pigmented vinyl film. It has a smooth surface with microscopic embossing for maximum light distribution and has a gain of 1.0 with a viewing angle of 50 degrees.

Rhodamine 6G was coated onto the Hurley Screen MW-16 screen material as follows. Rhodamine 6G dye was dissolved in 1-butanol and diluted to make coatings with a variety of optical densities. Square samples of Hurley Screen MW-16 were cut to dimensions of 2" by 2" and spin coated at 2000 RPM with the diluted rhodamine 6G dye solutions. Samples were then heated to 50° C. and dried for 30 minutes before testing. Samples were prepared having optical densities of 0.0, 0.04, 0.12, 0.30, 0.60 for incident light having a peak wavelength of 532 nm.

The five different screen samples were mounted onto a poster board and all samples were illuminated simultaneously under uniform illumination conditions using a laser projection system. The laser projection system used green lasers having a wavelength of 532 nm, blue lasers having a wavelength of 465 nm and red lasers having a wavelength of 637 nm.

Speckle contrast measurements for the five different screen samples were performed simultaneously using a Canon-EOS Rebel XSi 12.2 Mpixel camera (4272×2848 pixels) with a 28-135 mm zoom lens set to a focal length of 135 mm. The camera was mounted on a tripod located 10 ft from the screen during the measurements. Raw camera images were used throughout and converted to 16 bit TIFF files for analysis.

Each pixel in the captured digital image files corresponded to a screen area of 175×175 microns. For comparison, for normal 20/20 vision the eye's angular resolution is approximately 1.0 arc minutes, and some individuals have better visual acuity down to 0.3 arc minutes. For a 1.0 arc minute angular resolution and a 10 ft viewing distance, the normal eye resolution would be about 880 microns, and the eye resolution for the best visual acuity would be about 260 microns. Therefore, it can be seen that the captured digital image contains sufficient spatial detail to adequately characterize the visibility of the speckle patterns.

Speckle contrast was calculated by locating each of the five screen patches mounted on the poster board in the captured digital camera image. Calculations were performed using 200×200 camera pixels regions selected from within each screen patch. Mean and standard deviation of the raw linear camera code values in all three color channels were measured to calculate the speckle contrast in each of the wavelength bands. Since we only have a green emitter in these samples only the green color channel is active to provide speckle reduction by the mechanism of spectral broadening. This is demonstrated in Table 4 which shows data for white light, green light, red and blue incident light.

TABLE 4

Measured speckle contrast for rhodamine 6G coated screens

| | | | | Measured Speckle Contrast vs OD of rhodamine 6G dye | | | | | |
|---|---|---|---|---|---|---|---|---|---|
| Condition | Exposure Time (sec) | F/# | Laser Color(s) | OD 0.00 | OD 0.04 | OD 0.12 | OD 0.30 | OD 0.60 | Ratio OD 0.04/0.00 |
| 1 | 1/30 | 16 | G | 0.0885 | 0.0750 | 0.0749 | 0.0996 | 0.1314 | 0.8469 |
| 2 | 1/20 | 16 | G | 0.0794 | 0.0655 | 0.0652 | 0.0887 | 0.1287 | 0.8251 |
| 3 | 1/60 | 16 | G | 0.0523 | 0.0424 | 0.0422 | 0.0535 | 0.0696 | 0.8101 |
| 4 | 1/60 | 11 | G | 0.0521 | 0.0435 | 0.0439 | 0.0518 | 0.0654 | 0.8339 |
| 5 | 1/30 | 11 | RGB | 0.0194 | 0.0157 | 0.0158 | 0.0204 | 0.0326 | 0.8085 |
| 6 | 1/30 | 16 | RGB | 0.0319 | 0.0269 | 0.0275 | 0.0387 | 0.0579 | 0.8445 |
| 7 | 1/30 | 22 | RGB | 0.0414 | 0.0355 | 0.0363 | 0.0512 | 0.0808 | 0.8576 |
| 8 | 1/30 | 22 | RGB | 0.0411 | 0.0351 | 0.0372 | 0.0500 | 0.0798 | 0.8537 |
| 9 | 1/30 | 22 | RGB | 0.0414 | 0.0350 | 0.0365 | 0.0521 | 0.0790 | 0.8448 |
| 10 | 1/30 | 22 | R | 0.0214 | 0.0213 | 0.0209 | 0.0206 | 0.0201 | 0.9977 |
| 11 | 1/30 | 11 | B | 0.0207 | 0.0206 | 0.0227 | 0.0260 | 0.0272 | 0.9978 |

The first column in Table 4 shows the measurement condition number. The measurement condition includes the camera exposure time in seconds shown in column 2, the camera F/# shown in the column 3, and the color of the incident laser(s) used to illuminate the screen is shown in column 4. Columns 5-9 of Table 4 show measured speckle contrast calculated from Eq. (1) for the uncoated screen sample (OD 0), and the coated screen samples having rhodamine 6G dye layers with optical densities of 0.04, 0.12, 0.30 and 0.60, respectively. For conditions 1-4, which utilize green laser light only, and conditions 5-9, which utilize combined red, green and blue laser light, the speckle contrast data is reported using only the green color channel data. For condition #10, which utilizes red laser light only, the speckle contrast data is reported using the red color channel data; and for condition #11, which utilizes blue laser light only, the speckle contrast data is reported using the blue color channel data. The last column of Table 4 shows the ratio of the OD 0.04 data to the OD 0.00 data.

This data shows that the best speckle reduction generally occurred for the OD 0.04 samples, where there was a 14-20% speckle reduction over the uncoated samples when green laser light is incident on the screen samples. While the numbers would appear to suggest that this improvement is fairly small on a percentage basis, the visual impression of the improvement is actually much more significant than these numbers reveal. While the visible speckle levels with the green laser light are quite objectionable for the OD 0.00 sample, the visible speckle has been dramatically reduced for the OD 0.04. This disparity between the magnitude of the speckle contrast and the visibility of the speckle artifacts to a human observer is presumably a reflection of deficiencies in the speckle contrast metric, which does not take into account the frequency content of the speckle or the frequency response of the human vision system.

From Table 4, it can also been seen that the speckle levels for conditions #10 and #11 remain essentially constant. This is consistent with the fact that the rhodamine 6G fluorescent agent is only effective for absorbing the green laser light. Therefore, there will be no spectral broadening for the red and blue color channels, and no corresponding reduction in the speckle artifacts.

Table 5 shows the measured mean camera code values of the various coated screen samples corresponding to the data shown in Table 4. Columns 1-4 in Table 5 are the same as in Table 4. Columns 5-9 of Table 5 show the mean camera code values for the screen samples with rhodamine 6G optical densities of 0.00, 0.04, 0.12, 0.30, and 0.60, respectively, corresponding to the speckle contrast measurements in Table 4. (The digital camera saturates at 65535 counts. During the measurements the maximum camera counts per color channel were also measured. The exposure times and F/# combinations shown in Tables 4 and 5 were selected so that no pixels with saturated code values were observed for any of the reported data.) It can be seen that for higher dye densities, there is an observable reduction in the camera code values, reflecting a lower screen brightness level due to the fact that the fluorescent dye is absorbing more light than it is emitting.

TABLE 5

Measured mean code values for rhodamine 6G coated screens

| Condition | Exposure Time (sec) | F/# | Laser Color(s) | OD 0.00 | OD 0.04 | OD 0.12 | OD 0.30 | OD 0.60 |
|---|---|---|---|---|---|---|---|---|
| 1 | 1/30 | 16 | G | 30352 | 29652 | 26503 | 19325 | 14091 |
| 2 | 1/20 | 16 | G | 41351 | 40754 | 37432 | 28151 | 21004 |
| 3 | 1/60 | 16 | G | 26629 | 26455 | 22750 | 14482 | 8040 |
| 4 | 1/60 | 11 | G | 42097 | 41994 | 37586 | 25340 | 14654 |
| 5 | 1/30 | 11 | RGB | 55816 | 54610 | 50719 | 42032 | 30280 |
| 6 | 1/30 | 16 | RGB | 39251 | 38389 | 33806 | 25234 | 14759 |
| 7 | 1/30 | 22 | RGB | 24645 | 23982 | 20122 | 13560 | 6664 |
| 8 | 1/30 | 22 | RGB | 24898 | 24267 | 20369 | 13738 | 6846 |
| 9 | 1/30 | 22 | RGB | 24969 | 24356 | 20504 | 13894 | 6877 |
| 10 | 1/30 | 22 | R | 30104 | 31028 | 30868 | 31110 | 29430 |
| 11 | 1/30 | 11 | B | 39522 | 39900 | 38055 | 34388 | 24967 |

Figure 6B:
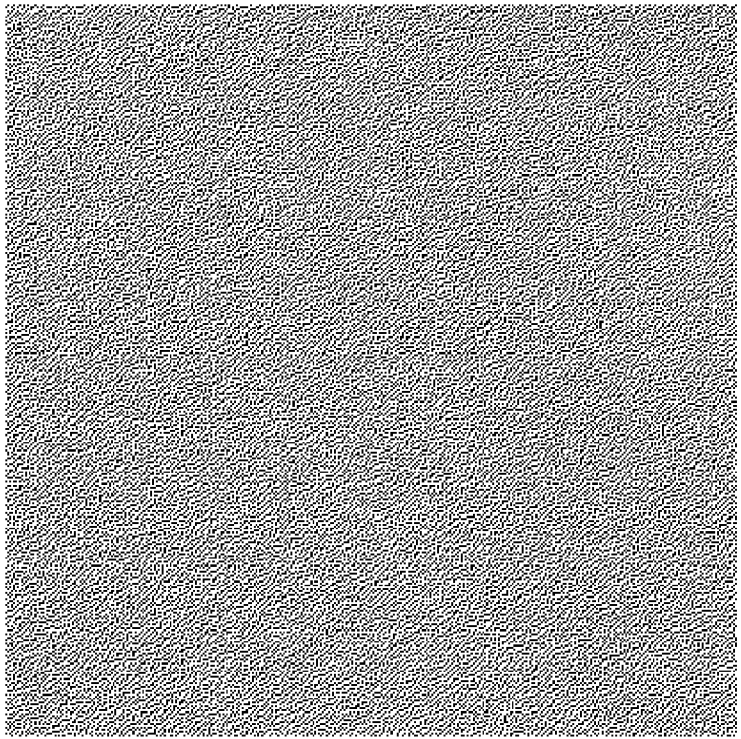
FIG. 6B shows an image having reduced speckle produced according to the present invention.
Figure 6A:
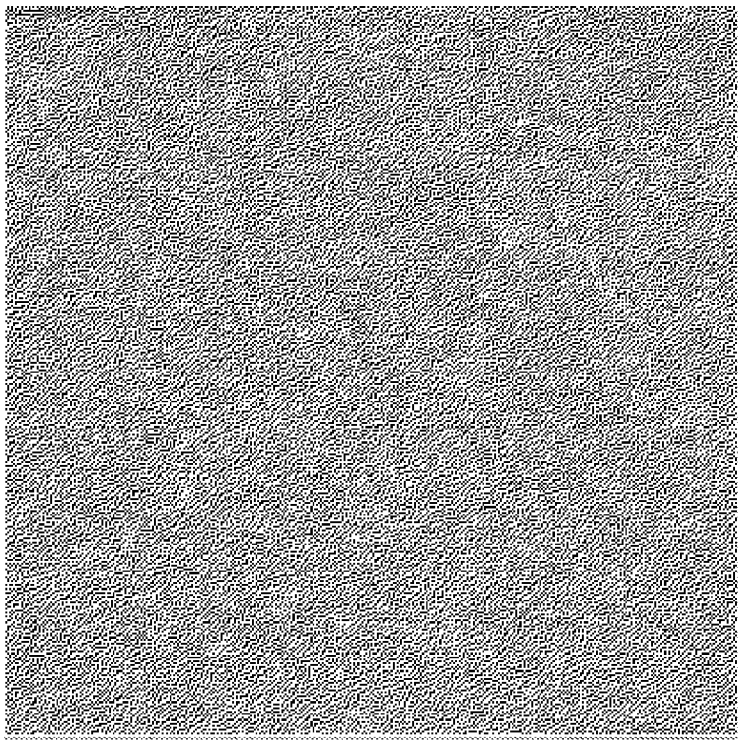
FIG. 6A shows an image of an example speckle pattern produced with no fluorescent agent.

FIGS. 6A and 6B shows images of the green color plane of the 200×200 pixel regions of the Hurley Screen MW-16 material samples without (dye optical density=0.00) and with a low optical density coating (dye optical density=0.04) of rhodamine 6G fluorescent dye respectively. Both of these images were obtained using illumination and camera set up condition 2 from Table 4, with green only incident laser light of 532 nm. While it is uncertain whether the differences will be clear in the printed figures, there is a dramatic decrease in the visibility of the speckle artifacts for FIG. 6B relative to FIG. 6A in the original images used to produce these figures.

Figure 7:
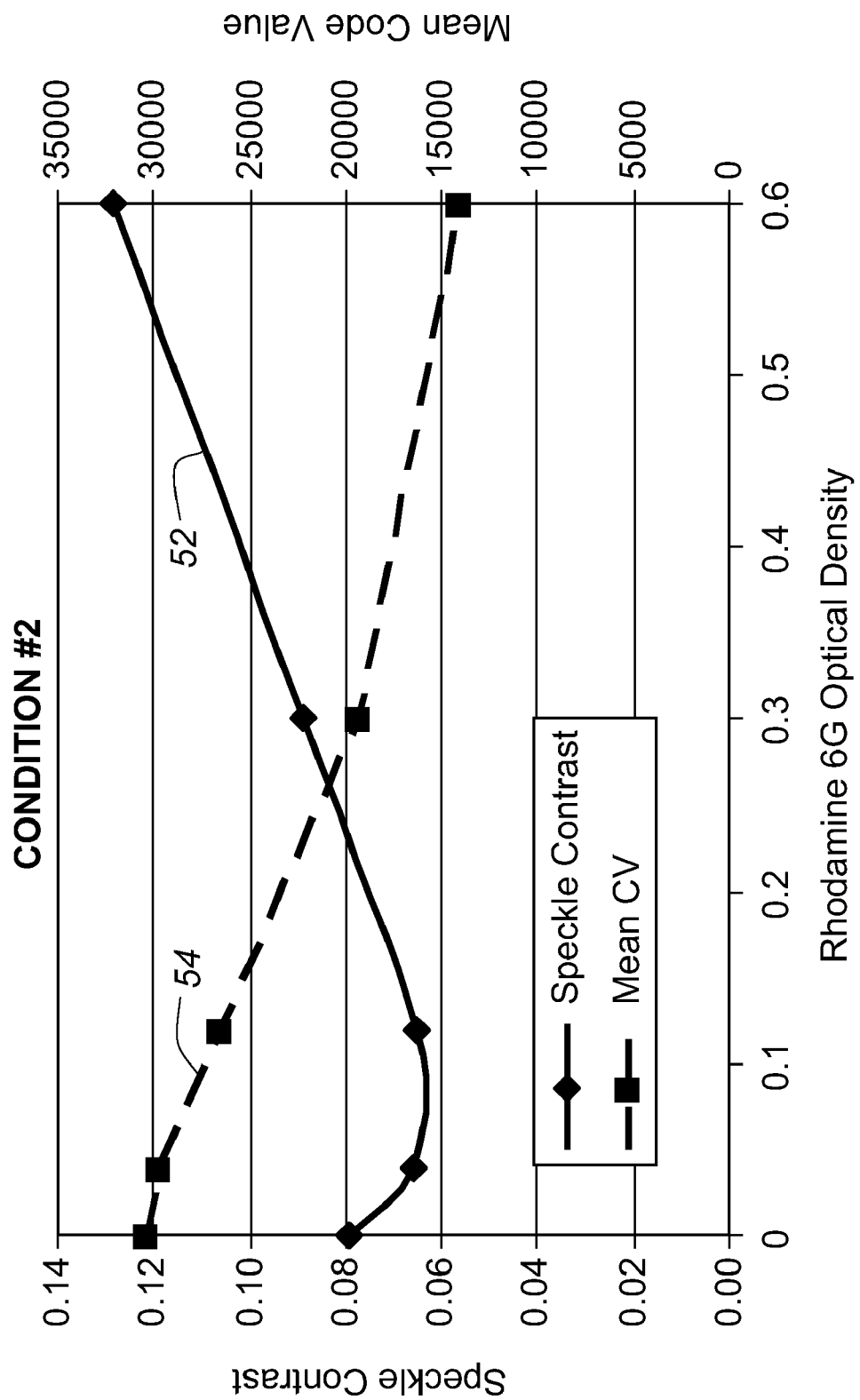
FIG. 7 is a graph plotting measured speckle contrast and mean code value for green laser light as a function of optical density for a rhodamine 6G fluorescent agent.

FIG. 7 shows a graph of the measured speckle contrast 52 as a function of screen optical density of rhodamine 6G for illumination and camera set up condition #2. Note that the speckle contrast improves for low optical density coatings. At OD of 0.3 and above the speckle contrast was found to be worse than that for the screen without any rhodamine 6G coating. While the amount of spectral broadening for these samples will be larger, and therefore the amount of speckle reduction due to spectral broadening should be better, there are apparently other sources of speckle artifacts that arise at high dye concentrations which begin to dominate the reduced speckle levels that would be expected due to the spectral broadening.

It is likely the increased speckle levels arise from non-uniformities in the thickness or density of the fluorescent dye coating. At higher optical densities there is a tendency for fluorescent dye molecules to aggregate which can result in fluorescence quenching. Rhodamine 6G is known to form dimers, trimers and higher aggregates in high optical density solutions which result in fluorescence quenching. (For more information see the article "The fluorescence quenching mechanisms of Rhodamine 6G in concentrated ethanolic solution" by F. López Arbeloa et al. in Journal of Photochemistry and Photobiology A: Chemistry, Vol. 45, Pages 313-323, 1988). Therefore, it would be expected that improved deposition or coating methods for providing the fluorescent agents 27 to the display surface 30 could allow higher dye densities to be used without observing the upswing in the speckle contrast. An example of such an improved coating method is described in the article "Fluorescent Plasma Nanocomposite Thin Films Containing Nonaggregated Rhodamine 6G Laser Dye Molecules" by A. Barranco and P. Groening, Langmuir, Vol. 22, pp 6719-6722 (2006).

Also shown in FIG. 7 is a curve plotting the measured mean code values 54 in the green color channel as a function of screen optical density of rhodamine 6G for illumination. It is observed that the amount of green light reflected from the screen is monotonically decreasing as the optical density of the rhodamine 6G coating increases.

Figure 8:
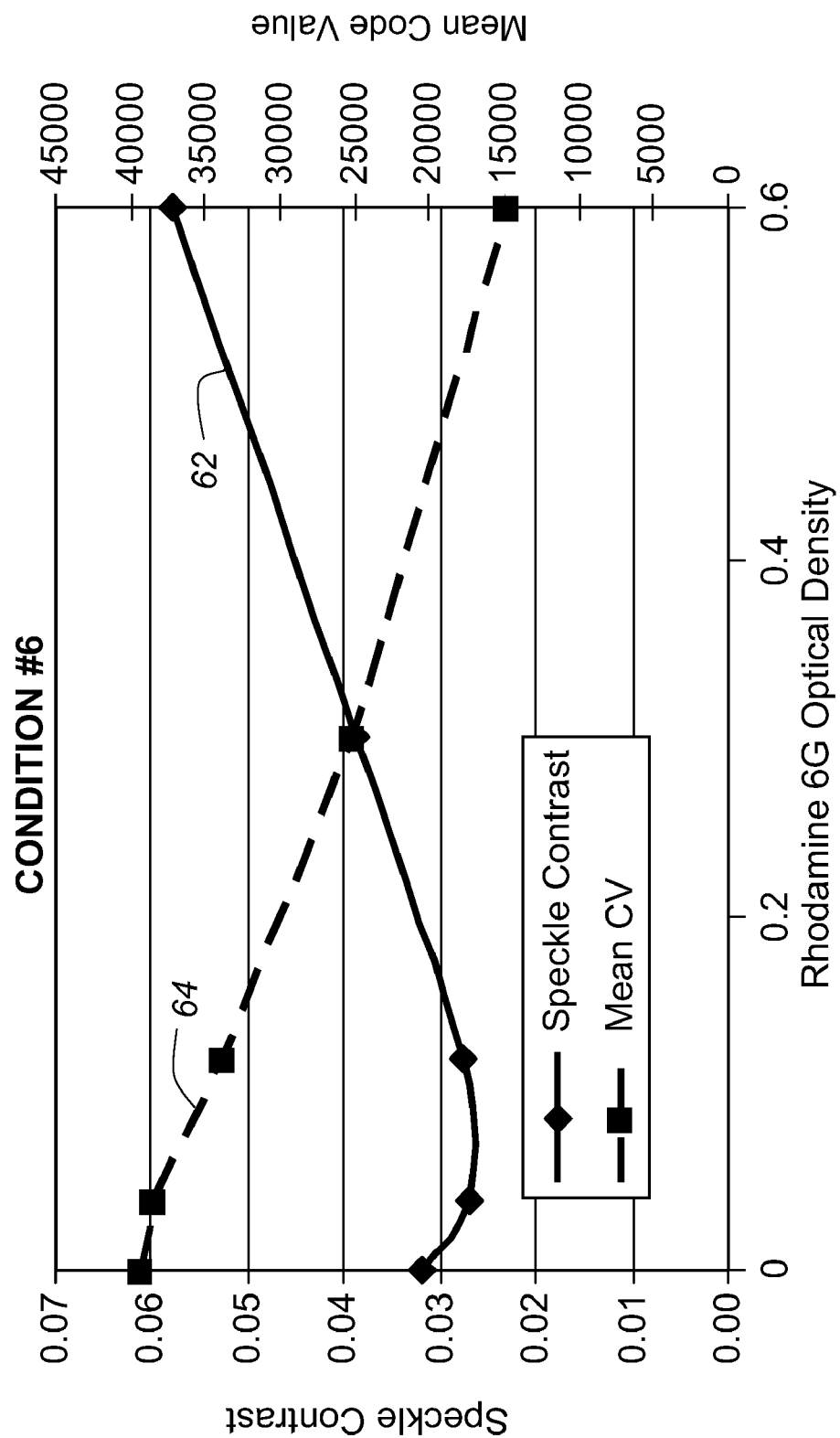
FIG. 8 is a graph plotting measured speckle contrast and mean code value for red, green and blue laser light as a function of optical density for a rhodamine 6G fluorescent agent.

FIG. 8 shows a similar graph of the measured speckle contrast 62 and the measured mean code values 64 in the green color channel as a function of screen optical density of rhodamine 6G for camera set up condition #6. While condition #2 utilizes only incident green laser light, condition #6 utilizes white incident light formed by activating the red, green and blue laser sources. The white light condition of FIG. 8 exhibits the same trends for speckle reduction and mean camera counts as the green light only condition of FIG. 7. Note that since the speckle contrast calculated for this graph used only the green color channel of the digital camera image, therefore it will not provide an indication of the visibility of any speckle which may be present in the red and blue color channels.

For condition #10, which used only red laser light illumination, only the red color channel is relevant for the calculation of speckle contrast. In this case, the speckle contrast and mean code values in Tables 4 and 5 were determined using only the red color channel data. Likewise, for condition #11 which used only blue laser light illumination, only the blue color channel is relevant for the calculation of the speckle contrast and the mean code values. In both cases, it can be seen that the speckle in the red and blue color channels was relatively unaffected by the rhodamine 6G fluorescent agent as would be expected.

Figure 9:
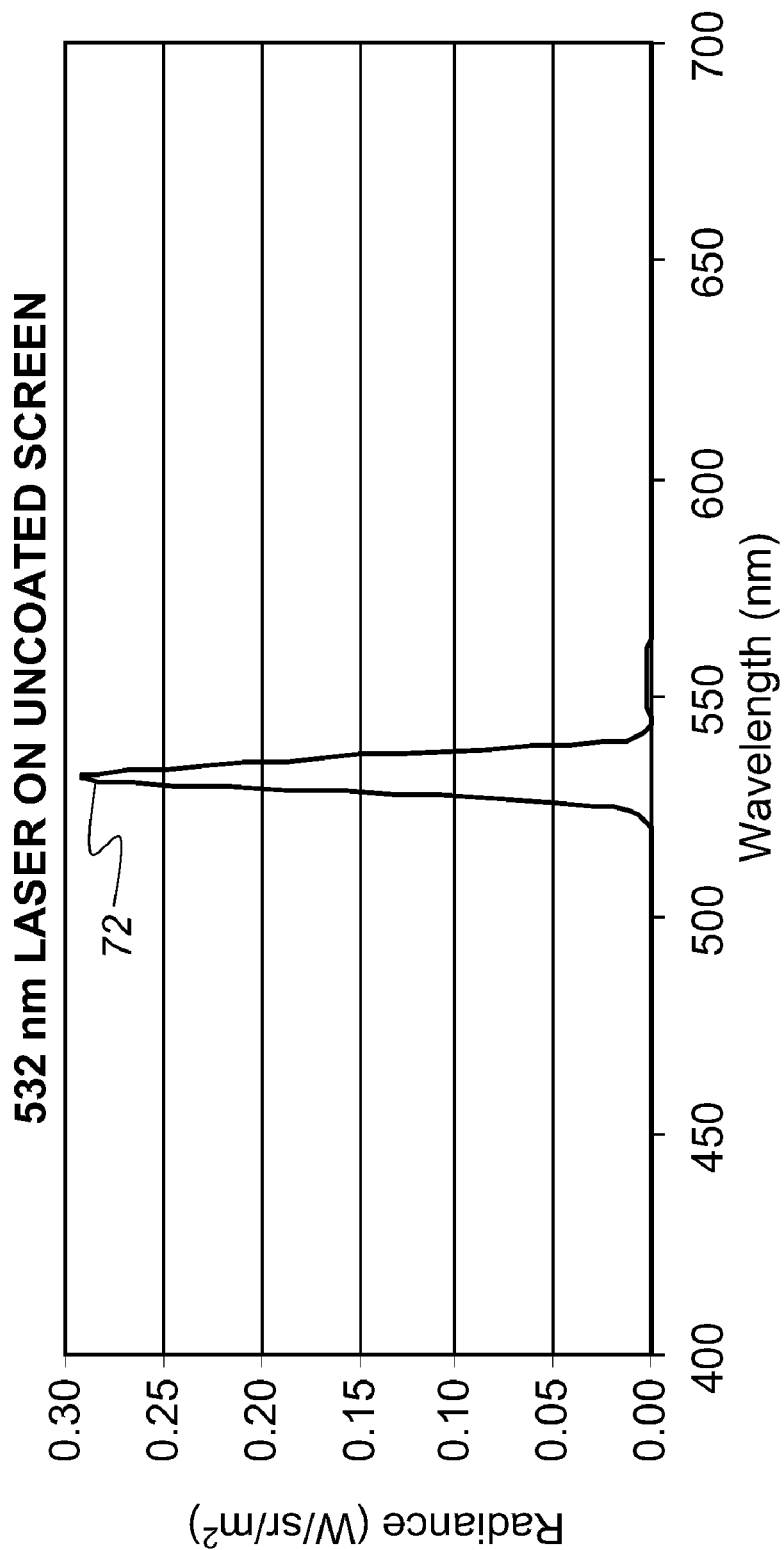
FIG. 9 is a graph of the measured spectral radiance versus wavelength for green laser light incident on an uncoated screen sample.

Color measurements were obtained with a Photo Research PR650 Spectral Colorimeter. The spectral radiance in W/(sr·m²) was measured for green laser light, as well "white laser light" made by a combination of red, green and blue laser light. FIG. 9 shows a graph of the measured spectral radiance versus wavelength for 532 nm green laser light incident on an uncoated screen sample. Since there is only one laser turned on in the projector there is only a single green reflection peak 72 at 532 nm in the spectral radiance plot. Even though the laser bandwidth is less than 0.5 nm the measured spectrum appears much broader, which is due to the spectral bandwidth of the instrument, which is about 10 nm.

Figure 10:
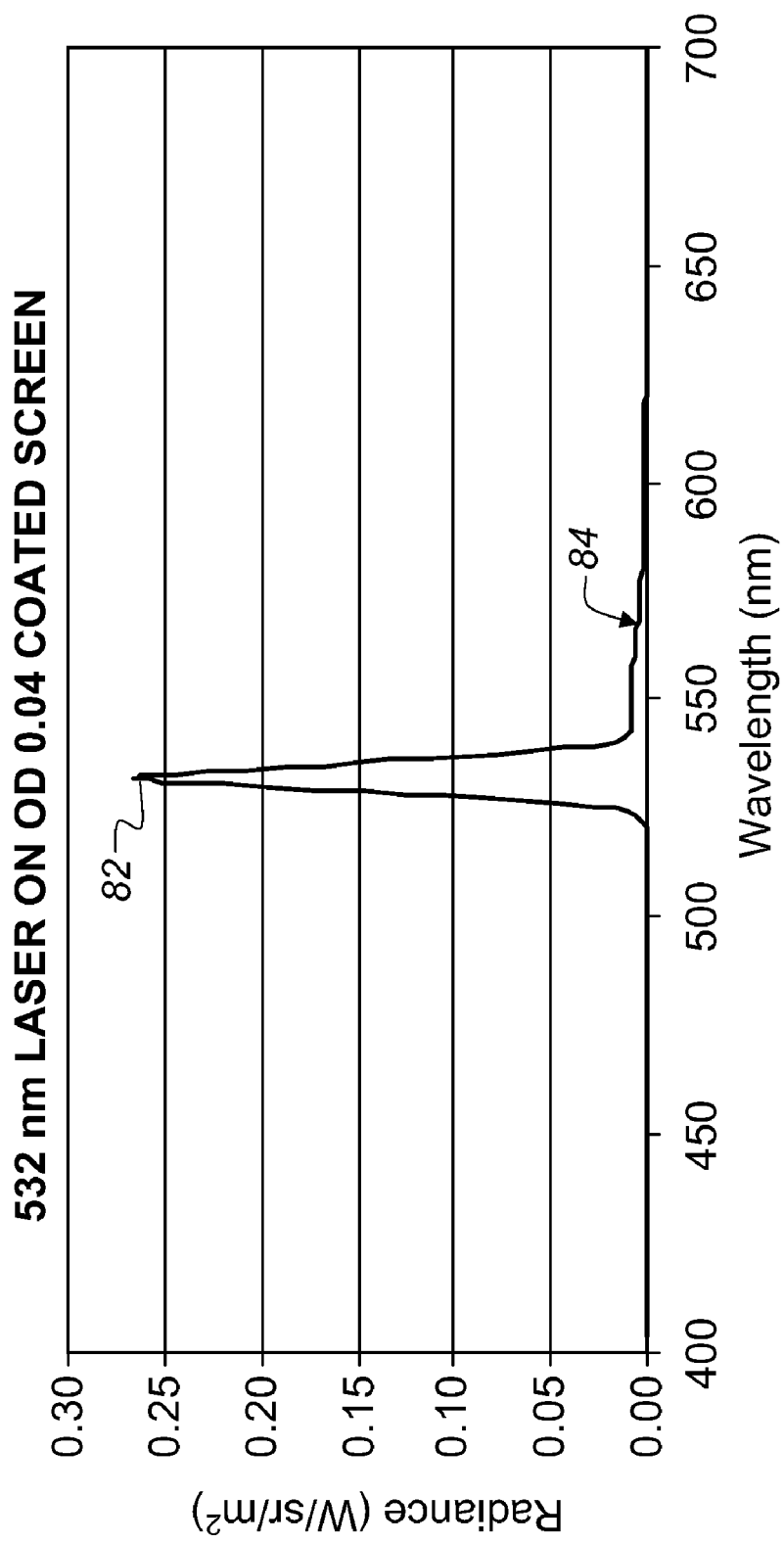
FIG. 10 is a graph of the measured spectral radiance versus wavelength for green laser light incident on a screen sample with an OD=0.04 coating of a rhodamine 6G fluorescent agent.

FIG. 10 shows a graph of the spectral radiance versus wavelength for the 532 nm laser light incident on the rhodamine 6G coated screen sample having an optical density of OD=0.04. As in FIG. 9, a green reflection peak 82 can be observed corresponding to the 532 nm laser light. However, it can be seen that the magnitude of the spectral radiance at the green reflection peak 82 has decreased slightly from that of the uncoated film measurement, and that some of the light has been shifted to longer wavelengths as indicated by the appearance of a green fluorescence band 84. As will be discussed below, the shift of the return light from the green reflection peak 82 into the green fluorescence band 84 results in a shift in x and y chromaticity coordinates.

Figure 11:
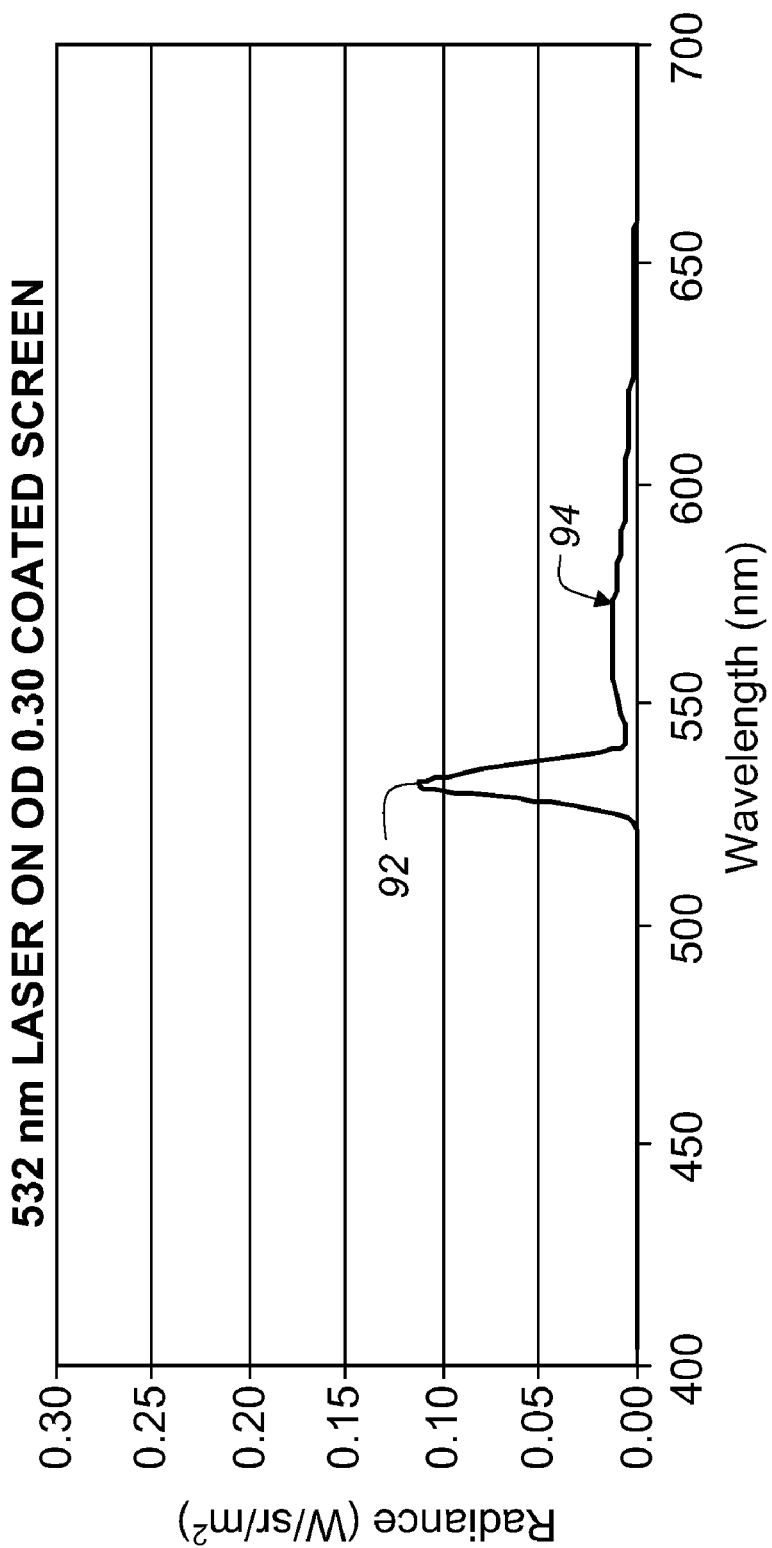
FIG. 11 is a graph of the measured spectral radiance versus wavelength for green laser light incident on a screen sample with an OD=0.30 coating of a rhodamine 6G fluorescent agent.

FIG. 11 shows a graph of the spectral radiance versus wavelength for the 532 nm laser light incident on the rhodamine 6G coated screen sample having an optical density of OD=0.3. As in FIG. 10, both a green reflection peak 92 and a green fluorescence band 94 can be observed. For this higher optical density coating, the peak intensity of the green reflection peak 92 has decreased much further and the green fluorescence band 94 centered at 560 nm is much more pronounced.

Figure 12:
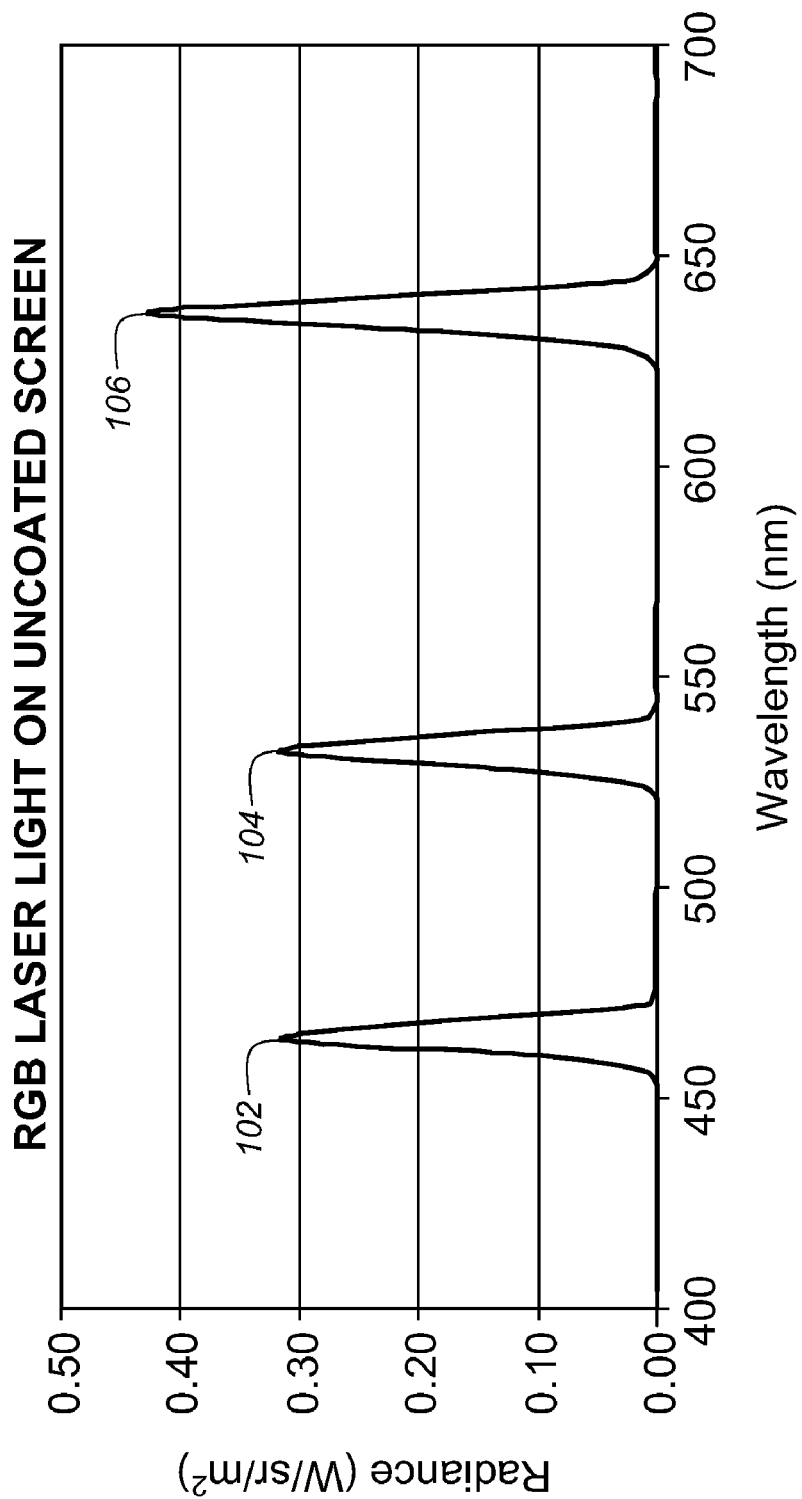
FIG. 12 is a graph of the measured spectral radiance versus wavelength for red, green and blue laser light incident on an uncoated screen sample.

FIG. 12 shows a graph of the spectral radiance versus wavelength for white light screen illumination formed by combining light from a 465 nm blue laser light source, a 532 nm green laser light source and a 637 nm red laser light source incident on an uncoated screen sample. Three peaks are now observed in the spectral radiance data: a blue reflection peak 102 at 465 nm, a green reflection peak 104 at 532 nm and a red reflection peak 106 at 637 nm. (Even though the bandwidths of each of the lasers are less than 0.5 nm they all appear to be broader due to the spectral bandwidth of the instrument.)

Figure 13:
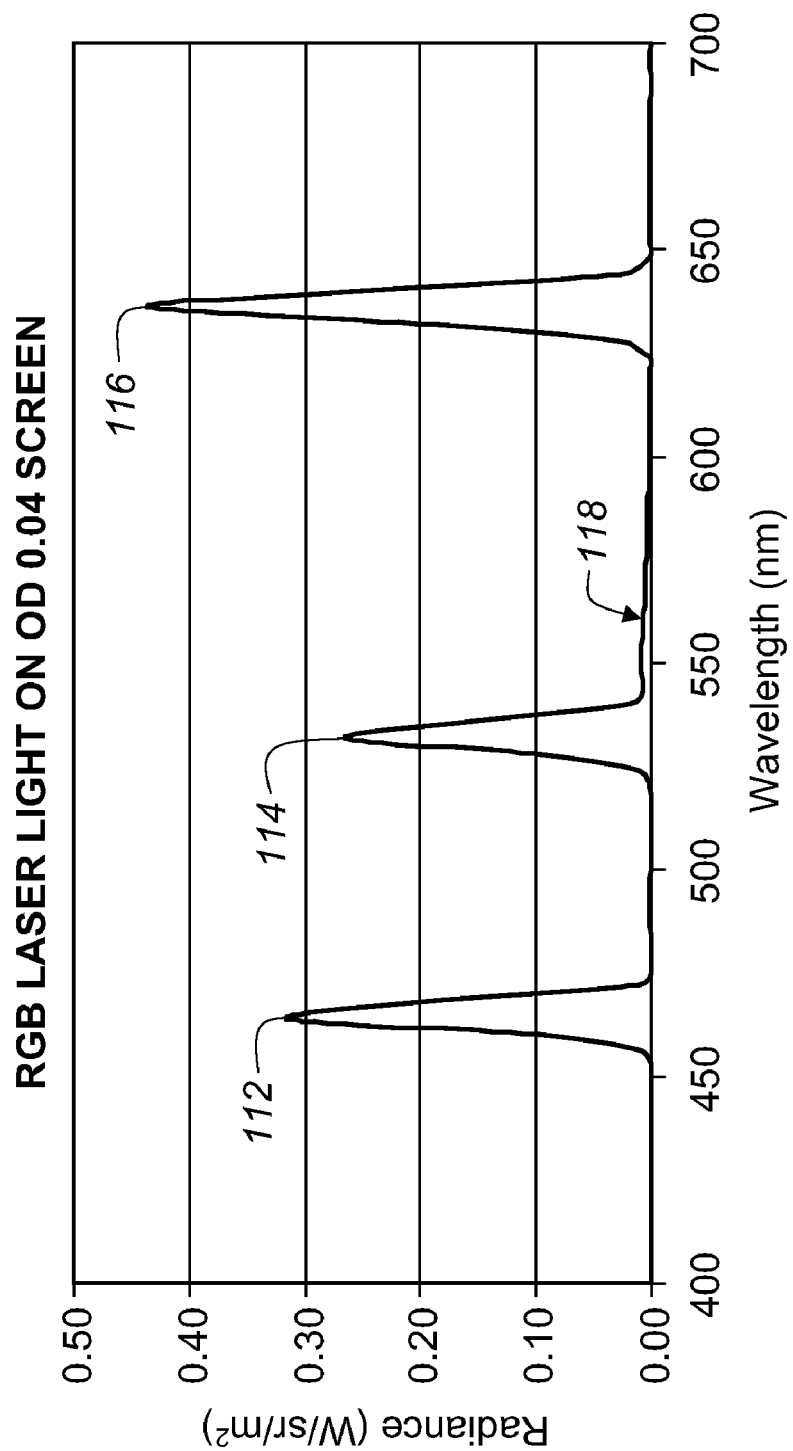
FIG. 13 is a graph of the measured spectral radiance versus wavelength for red, green and blue laser light incident on a screen sample with an OD=0.04 coating of a rhodamine 6G fluorescent agent.

FIG. 13 shows a graph of the spectral radiance versus wavelength for the case where the same white light screen illumination as in FIG. 12 is incident on the screen sample coated with rhodamine 6G an optical density of OD=0.04. As in FIG. 12, a blue reflection peak 112, a green reflection peak 114 and a red reflection peak 116 can be observed, although the magnitude of the spectral radiance at the green reflection peak 114 has decreased slightly from that of the uncoated screen shown in FIG. 12. Additionally, it can be seen that some of this light has been shifted to longer wavelengths between 532 and 575 nm in green fluorescence band 128. The magnitude of the blue reflection peak 112 and the red reflection peak 116 are essentially unchanged relative to the uncoated screen measurement shown in FIG. 12.

Preferably, the peak wavelength of the green fluorescence band 128 is closer to the green reflection peak 114 than to either the blue reflection peak 112 or the red reflection peak 116. To maintain separation between the different primaries, it is generally desirable that the green fluorescence band 128 extend to no less than about 30 nm away from the peak wavelengths of the blue reflection peak 112 and the red reflection peak 116. The fluorescent agent that produces the green fluorescence band 118 should generally absorb a fraction of the green incident light, but should not absorb any appreciable amount of the red and blue incident light (e.g., less than 10%).

Figure 14:
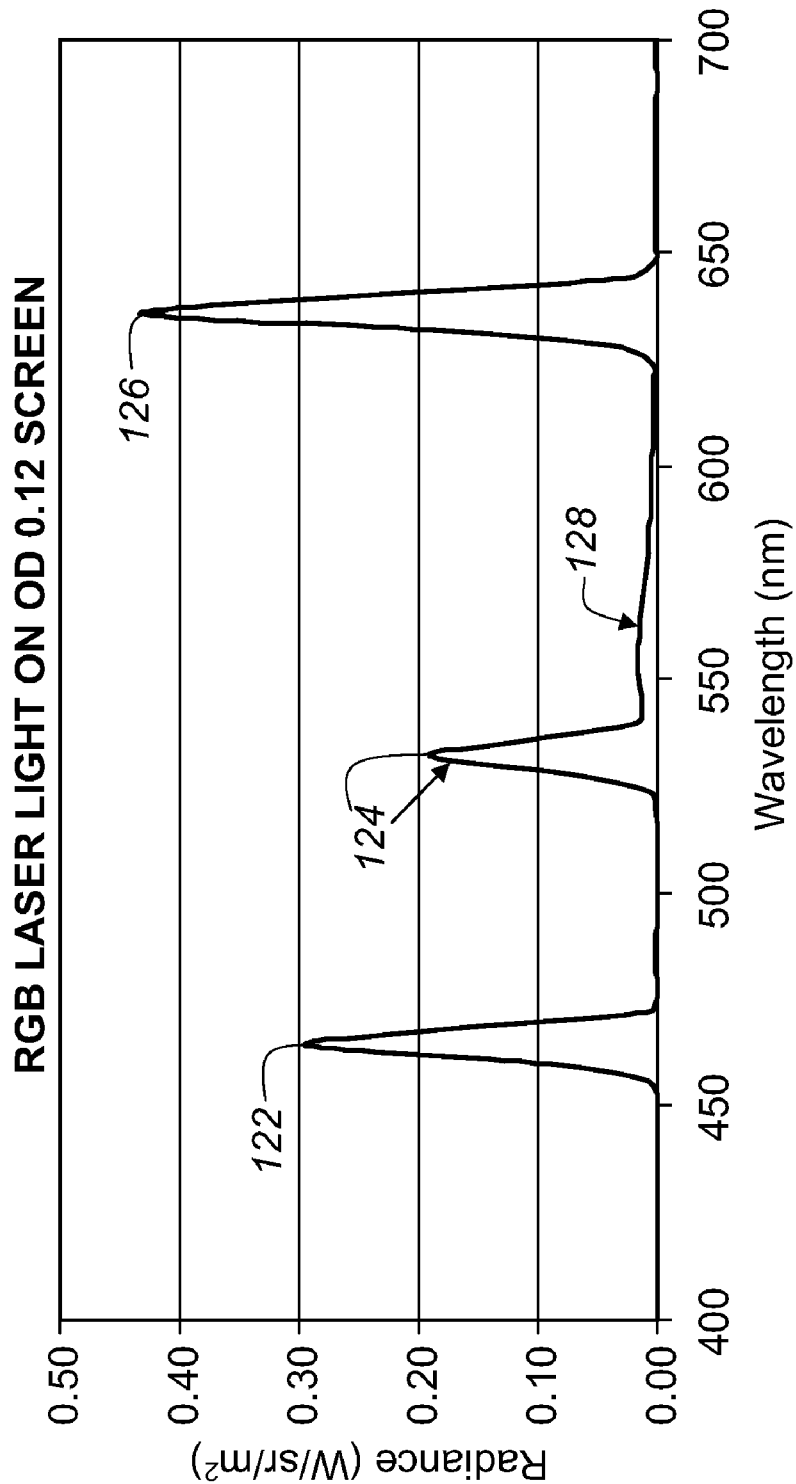
FIG. 14 is a graph of the measured spectral radiance versus wavelength for red, green and blue laser light incident on a screen sample with an OD=0.30 coating of a rhodamine 6G fluorescent agent.

Similarly, FIG. 14 shows a graph of the spectral radiance versus wavelength for the case where the same white light screen illumination as in FIG. 12 is incident on the screen sample coated with rhodamine 6G to an optical density of OD=0.12. As in FIG. 13, the spectral radiance includes a blue reflection peak 122, a green reflection peak 124, a red reflection peak 126 and a green fluorescence band 128. Again, the magnitude of the blue reflection peak 122 and the red reflection peak 126 are the same as for the uncoated screen shown in FIG. 12. The decrease in the magnitude of the green reflection peak 124 shown in FIG. 14 is even greater than that shown in FIG. 13. The magnitude of the green fluorescence band 128 is also greater in FIG. 14 than in FIG. 13. These observations confirm that the green laser light is mostly responsible for the fluorescence from the screen coated with rhodamine 6G dye.

Figure 15:
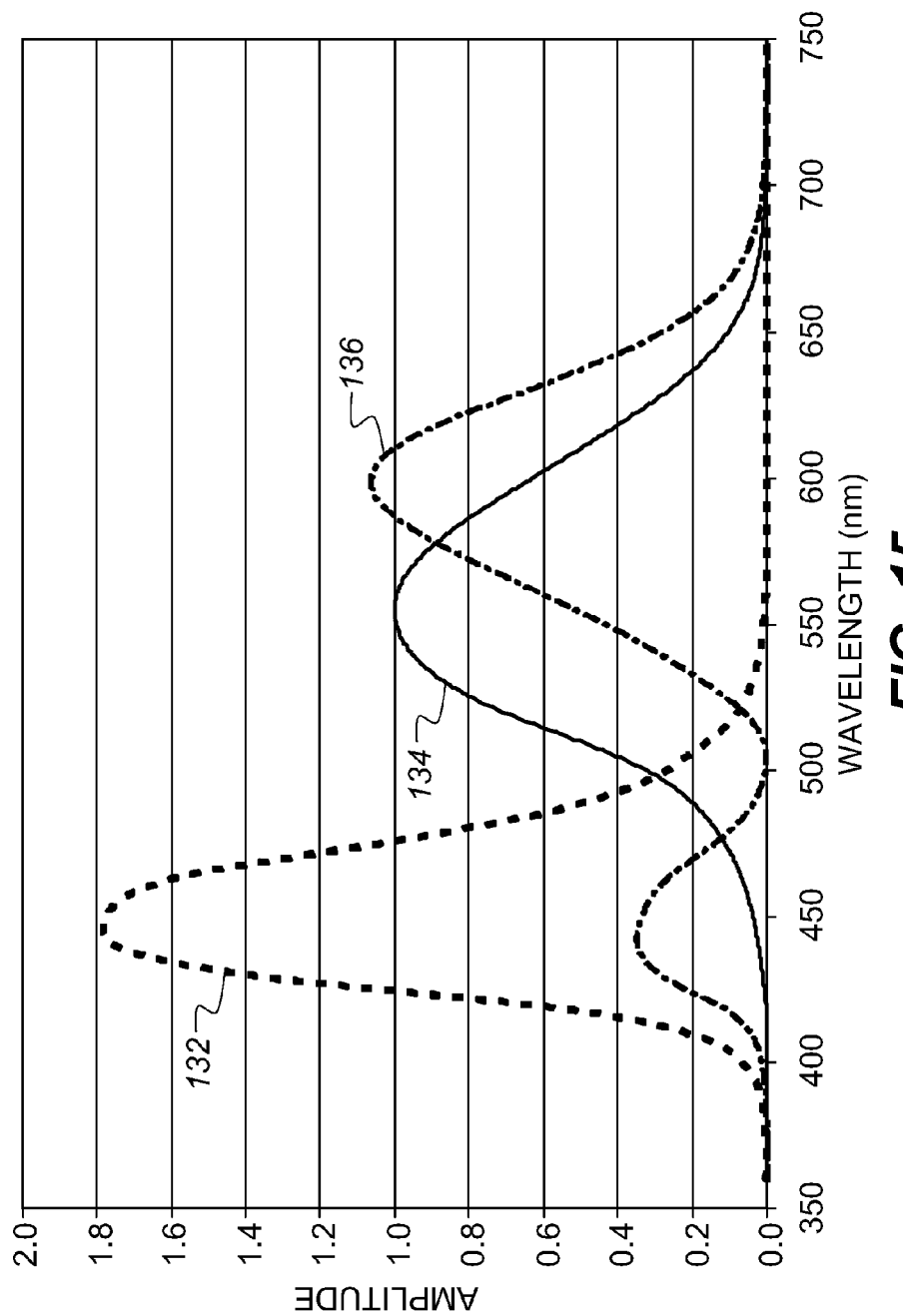
FIG. 15 shows a graph of the CIE 1931 2° color matching functions.

The PR650 Spectral Colorimeter also measures the luminance and the CIE chromaticity coordinates x and y. The chromaticity and luminance are calculated based on the 1931 CIE 2° color matching functions, $\bar{x}(\lambda)$, $\bar{y}(\lambda)$, and $\bar{z}(\lambda)$, by the following procedure. FIG. 15 is a graph showing the $\bar{x}(\lambda)$ color matching function 136, the $\bar{y}(\lambda)$ color matching function 134, and the $\bar{z}(\lambda)$ color matching function 132 plotted as a function of wavelength. First the CIE XYZ tristimulus values are calculated as:

$$X = \sum_\lambda S(\lambda)\bar{x}(\lambda)\Delta\lambda \qquad (2)$$

$$Y = \sum_\lambda S(\lambda)\bar{y}(\lambda)\Delta\lambda$$

$$Z = \sum_\lambda S(\lambda)\bar{z}(\lambda)\Delta\lambda$$

where $S(\lambda)$ is the spectral power distribution and $\Delta\lambda$ is the wavelength interval between the wavelength samples. The CIE 1931 color matching functions are usually tabulated in 1 nm increments, and in this case the wavelength interval would be 1 nm. The measured spectral radiance distributions shown in FIGS. 9-14 are equivalent to the spectral power distribution. The Y term in Eq. (2) is equivalent to the luminance of the measured color on the screen and is typically reported in foot lamberts (fl) or candelas per meter² (cd/m²). The chromaticity coordinates x, y, z are calculated by the relationships:

$$x = \frac{X}{X+Y+Z} \qquad (3)$$

$$y = \frac{Y}{X+Y+Z}$$

$$z = \frac{Z}{X+Y+Z} = 1 - x - y$$

Tables 6-9 show measured colorimetry data (luminance Y and chromaticity values x, y) for various illumination conditions on the uncoated screen sample and a selection of the rhodamine 6G coated film samples. Table 6 shows colorimetry data for the case of illuminating the screen samples with 532 nm green laser light. At an optical density of OD=0.04, it can be seen that there is a small color shift and a small luminance decrease. As the optical density of the dye increases, there are increasingly larger color shifts and decreases in screen luminance on the screen. Thus, increasing the optical density decreases the optical efficiency, which is undesirable.

TABLE 6

Measured colorimetry for green laser light illumination on Rhodamine 6G dye coated screens.

| OD   | Y (fl) | x      | y      |
|------|--------|--------|--------|
| 0.00 | 456.0  | 0.1799 | 0.783  |
| 0.04 | 443.7  | 0.2173 | 0.7504 |
| 0.12 | 402.8  | 0.276  | 0.6994 |
| 0.30 | 287.2  | 0.3356 | 0.643  |

Table 7 shows colorimetry data for the case of illuminating the screen samples with "white" laser light made up of combined blue (465 nm), green (532 nm) and red (637 nm) laser light. At an optical density of OD=0.04, the color shift and luminance decrease is small. However, as the optical density of the dye increases, it can be seen there are increasingly larger color shifts and decreases in overall screen luminance.

TABLE 7

Measured colorimetry for "white" laser light illumination on Rhodamine 6G dye coated screens.

| OD   | Y (fl) | x      | y      |
|------|--------|--------|--------|
| 0.00 | 655.0  | 0.2996 | 0.3177 |
| 0.04 | 648.8  | 0.3125 | 0.3094 |
| 0.12 | 602.9  | 0.3352 | 0.2999 |

Table 8 shows colorimetry data for the case of illuminating the screen samples with 637 nm red laser light. It was found that as the optical density of the rhodamine 6G dye was increased, there was no significant effect on the luminance and color of the red laser illumination. The same observations hold true for Table 9, which shows colorimetry data for the case of illuminating the screen samples with 465 nm blue laser light.

TABLE 8

Measured colorimetry for red laser light illumination on Rhodamine 6G dye coated screens.

| OD   | Y (fl) | x      | y      |
|------|--------|--------|--------|
| 0.00 | 159.5  | 0.7089 | 0.2857 |
| 0.04 | 158.8  | 0.7089 | 0.2858 |
| 0.12 | 157.9  | 0.7089 | 0.2859 |

TABLE 9

Measured colorimetry for blue laser light illumination on Rhodamine 6G dye coated screens.

| OD   | Y (fl) | x      | y      |
|------|--------|--------|--------|
| 0.00 | 48.1   | 0.1378 | 0.0441 |
| 0.04 | 47.4   | 0.1397 | 0.0482 |
| 0.12 | 45.7   | 0.1449 | 0.0572 |

The data for the rhodamine 6G dye coated onto the Hurley MW-16 screen material show that at low optical densities between 0.04 and 0.12 there is a 15-20% reduction in speckle contrast. In some embodiments, the dye concentration corresponding to the lowest speckle visibility can be determined by measuring a series of samples to determine the configuration that minimizes the speckle contrast (or some other measure of speckle visibility). In other embodiments, it may be desirable to consider other factors, such as the amount of color shift and luminance degradation, when determining the best dye concentration. At an optical density of 0.12, there is a noticeable decrease in the measured luminance reflecting off of the screen. There is also a greater color shift relative to the 0.04 optical density case. Therefore, in some applications it will be preferable to select an optical density at the lower end of this range to provide the optimal performance.

The selection of appropriate fluorescent dyes for a particular application should take into account the performance attributes that have been discussed above (speckle contrast reduction, screen luminance decrease, color shift (Stokes shift $\Delta\lambda s$) and emissive bandwidth $\Delta\lambda 2$), as well as other factors such as cost, availability, dye fade characteristics, physical durability and toxicity.

Even at relatively low dye concentrations, measurable color shifts can be observed as can be seen from Tables 6 and 7. To obtain the optimal image quality, it is desirable to compensate for any such color shifts introduced by the use of the fluorescent agents to reduce the speckle artifacts. This can be accomplished by using a color processor to apply an appropriate color correction transform to account for the spectral characteristics of the return light, which includes the reflected incident light together with the light emitted by the fluorescent agent.

Figure 16:
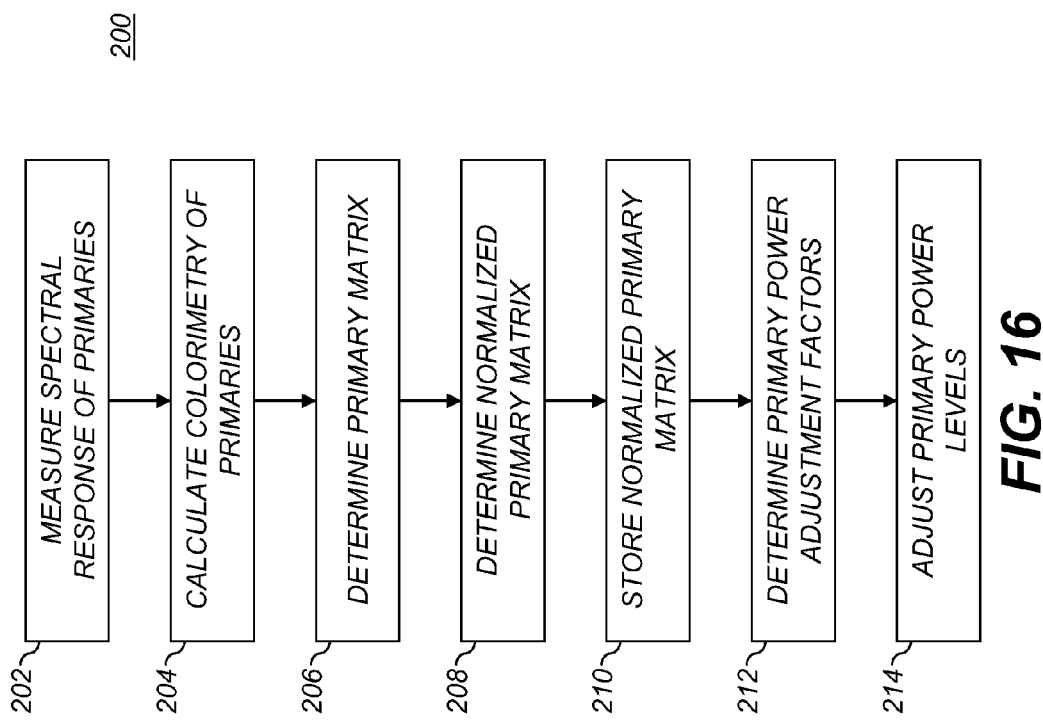
FIG. 16 shows a flow chart for color calibrating a digital projection system according to the present invention.

When a projector is set up, it usually has encoded into it a normalized primary matrix, which is based on the spectral distributions of the projector light sources. In order to correct for any color shifts induced by the viewing conditions, which would include the color shifts induced by the screen, it is necessary to calibrate the projector and screen under normal viewing conditions together as a system. FIG. 16 shows a color calibration process flow chart 200 describing steps that can be used to calibrate the projector and screen under normal viewing conditions according to a preferred embodiment. It will be recognized by one skilled in the art that many other variations of this color calibration process can be used in accordance with the present invention.

First, a measure spectral response of primaries step 202 is performed. This involves measuring the spectral response of each of the individual primary light sources with a spectrum measuring instrument such as a spectrophotometer or a spectroradiometer. In order to correct for any color shifts induced by the viewing conditions, which include the color shifts induced by the screen, it is necessary to measure each of the individual primary light sources in the context of the expected viewing environment by measuring return light from the viewing screen rather than directly measuring the spectrum of the light sources themselves. For the present example, it will be assumed that the laser projector has red, green and blue primaries, although this method can be generalized to apply to laser projectors with other sets of primaries. The measured spectral response for the $i^{th}$ primary light sources will be given by $S_i(\lambda)$, where i=R, G, B for the red, green and blue primary light sources, respectively.

Next, the primary tristimulus values and chromaticity coordinates are determined using a calculate colorimetry of primaries step 204. The tristimulus values $X_i$, $Y_i$, and $Z_i$ for the $i^{th}$ primary light source are calculated follows:

$$X_i = \sum_\lambda S_i(\lambda)\bar{x}(\lambda)\Delta\lambda \quad (4)$$

$$Y_i = \sum_\lambda S_i(\lambda)\bar{y}(\lambda)\Delta\lambda$$

$$Z_i = \sum_\lambda S_i(\lambda)\bar{z}(\lambda)\Delta\lambda$$

where these equations are adapted from Eq. (2). The chromaticity coordinates for each of the primary light sources $x_i$, $y_i$, $z_i$ are calculated from the relationships:

$$x_i = \frac{X_i}{X_i + Y_i + Z_i} \quad (5)$$

$$y_i = \frac{Y_i}{X_i + Y_i + Z_i}$$

$$z_i = 1 - x_i - y_i$$

A primary matrix P is then determined using a determine primary matrix step 206. This step forms the primary matrix P from the chromaticity coordinates of the primary light sources as follows:

$$P = \begin{bmatrix} x_R & x_G & x_B \\ y_R & y_G & y_B \\ z_R & z_G & z_B \end{bmatrix} \quad (6)$$

A determine normalized primary matrix 208 is then used to determine an appropriately normalized primary matrix. For this step, it will be assumed that the x and y chromaticity coordinates for the desired aim white point for the projector system are given as $x_w$, $y_w$, $z_w$. A white reference vector $W_{ref}$ is defined as:

$$W_{ref} = \begin{bmatrix} x_W/y_W \\ 1 \\ z_W/y_W \end{bmatrix} \quad (7)$$

As an example the DCI reference white point chromaticity values are $x_W$=0.314, $y_W$=0.351 and $z_W$=0.335. Now a color coefficient diagonal matrix C is calculated using the relationship:

$$C = I_3 \cdot (P^{-1} \cdot W_{ref}) \quad (8)$$

where $I_3$ is a 3×3 identity matrix and $P^{-1}$ is the inverse matrix of primary matrix P. The normalized primary matrix NPM is then given by:

$$NPM = P \cdot C$$

A store normalized primary matrix step 210 is then used to store the normalized primary matrix NPM into memory for use in color correcting displayed images. In some embodiments, the normalized primary matrix NPM is encoded into the projector's firmware. The normalized primary matrix NPM can be combined with a matrix associated with the color encoding of the input image in order to determine a primary conversion matrix that can be used to convert linear input RGB values into linear RGB values appropriate for display on the projector/display screen system. In some embodiments, the combined primary conversion matrix may be stored in memory rather than the normalized primary matrix NPM.

Next, a determine primary power adjustment factors step 212 is used to calculate power adjustment factors for each primary light source that are used to achieve the desired white point and luminance level. The power adjustment factors can be calculated as follows. For the white point, the tristimulus value is equivalent to the sum of the tristimulus values for the individual primary light sources. The tristimulus values determined in the calculate colorimetry of primaries step 204 ($X_R$, $Y_R$, $Z_R$ for the red primary light source, $X_G$, $Y_G$, $Z_G$ for the green primary light source and $X_B$, $Y_B$, $Z_B$ for the blue primary light source) were measured at an initial set of source power levels $P_{R0}$, $P_{G0}$, $P_{B0}$, where $P_{R0}$ is the red primary light source's initial power level, $P_{G0}$ is the green primary light source's initial power level, and $P_{B0}$ is the blue primary light source's initial power level. Generally, the power levels are measured in Watts, although other units of measurement can also be used in accordance with the present invention. As the relative powers between the three primaries are varied the color of the white point will be changed.

Coefficients $A_R$, $A_G$ and $A_B$ are defined as the ratios of a new power level to that of their initial power levels $P_{R0}$, $P_{G0}$ and $P_{B0}$. When the power levels are adjusted the new white point tristimulus values $X_n$, $Y_n$ and $Z_n$ are calculated by the relationship:

$$X_n = A_R X_R + A_G X_G + A_B X_B$$

$$Y_n = A_R Y_R + A_G Y_G + A_B Y_B$$

$$Z_n = A_R Z_R + A_G Z_G + A_B Z_B \quad (10)$$

The new white point chromaticity values $x_n$ and $y_n$ can be calculated by:

$$x_n = \frac{A_R X_R + A_G X_G + A_B X_B}{A_R(X_R + Y_R + Z_R) + A_G(X_G + Y_G + Z_G) + A_B(X_B + Y_B + Z_B)} \quad (11)$$

$$y_n = \frac{A_R Y_R + A_G Y_G + A_B Y_B}{A_R(X_R + Y_R + Z_R) + A_G(X_G + Y_G + Z_G) + A_B(X_B + Y_B + Z_B)}$$

Next, the three power ratio coefficients $A_R$, $A_G$ and $A_B$ can be determined by solving for the values that satisfy the conditions:

$$x_n = x_w$$

$$y_n = y_w$$

$$Y_n = Y_d \quad (12)$$

where $Y_d$ is the desired luminance level measured from the screen. The power ratio coefficients $A_R$, $A_G$ and $A_B$ can be determined using any method for solving systems of equations known in the art. For example, nonlinear solvers in software packages such as Matlab or Mathematica can be used to solve for the desired values.

Once the power ratio coefficients $A_R$, $A_G$ and $A_B$ are determined, an adjust primary power levels step 214 is used to determine new power levels for each of the primary light sources that will produce the specified white point chromaticity and luminance level. The new power levels for the primaries are calculated by:

$$P_R = A_R P_{R0}$$

$$P_G = A_G P_{G0}$$

$$P_B = A_B P_{B0} \tag{13}$$

where $P_R$, $P_G$ and $P_B$ are the new power levels for the red, green and blue primaries.

The exemplary color calibration process of FIG. 16 is equally applicable to variations of the present invention where more than one fluorescent agent 27 is used on the display surface 30. For example, it can be used for the case where a different fluorescent agent 27 is used for each color channel. It can also be used for the case where both Stokes and anti-Stokes fluorescing agents are used in at least one color channel.

In addition to fluorescent dyes and related compounds, other types of materials can also be applied to the display surface 30 (FIG. 1) as the fluorescent agent 27 for providing the equivalent low Stokes shift effect. For example, quantum dots can be used as the fluorescent agent 27. Quantum dots are semiconductor nanocrystals whose fluorescent response characteristics, including spectral shift, are a factor of crystal size. Commonly, quantum dots materials are fabricated using small particles of inorganic semiconductors having particle sizes less than about 40 nm. More information about quantum dots can be found in U.S. Patent Application Publication 2008/0217602 to Kahen, entitled "Quantum dot light emitting device."

Exemplary quantum dot materials include, but are not limited to, small particles of CdS, CdSe, ZnSe, InAs, GaAs and GaN. Similar to the fluorescent dyes described with reference to FIG. 3, the quantum dot, when excited by light radiation at first wavelength $\lambda 1$ emits a fluorescent response radiation at second wavelength $\lambda 2$. Unlike fluorescent dyes, however, the emitted wavelengths depend on the quantum dot particle size, the particle surface properties, and the inorganic semiconductor material that is used. Advantageously, because of their small size, quantum dot materials dispersed in host materials exhibit low optical backscattering.

Colloidal dispersions of highly luminescent core/shell quantum dots have been fabricated by a number of researchers over the past decades (for example, see B. O. Dabbousi et al, "(CdSe)ZnS Core-Shell Quantum Dots: Synthesis and characterization of a size series of highly luminescent nanocrystallites," J. Phys. Chem. B 1997, Vol. 101, 9463-9475, 1997). A light emitting core can be composed of type IV (Si), III-V (InAs), or II-VI (CdTe) semiconductive material. For emission in the visible part of the spectrum, CdSe is a preferred core material since by varying the diameter of the CdSe core in the range 1.9 to 6.7 nm, the emission wavelength can be tuned from 465 to 640 nm.

As is well known in the art, visible emitting quantum dots can be fabricated from other material systems, such as, doped ZnS. The light emitting cores are made by chemical methods well known in the art. Typical synthetic routes for this fabrication include decomposition of molecular precursors at high temperatures in coordinating solvents, solvothermal methods, and arrested precipitation. The semiconductor shell surrounding the core is typically composed of type II-VI semiconductive material, such as, CdS or ZnSe. The shell semiconductor is typically chosen to be nearly lattice-matched to the core material and to have valence and conduction band levels such that the core holes and electrons are largely confined to the core region of the quantum dot. Preferred shell material for CdSe cores is $ZnSe_xS_{1-x}$, with x varying from 0.0 to ~0.5. Formation of the semiconductor shell surrounding the light emitting core is typically accomplished via the decomposition of molecular precursors at high temperatures in coordinating solvents or using reverse micelle techniques.

For colloidal synthesis of semiconductor nanocrystals such as quantum dots, a three-component system of: precursors, organic surfactants, and solvents is used. After a reaction medium is heated to a sufficiently high temperature, the precursors chemically transform into monomers. Once the monomers reach a high enough supersaturation level, nanocrystal growth begins with a nucleation process. Temperature during this growth process is one factor in determining optimal conditions for nanocrystal growth and must be high enough to allow for rearrangement and annealing of atoms during the synthesis process while low enough to promote crystal growth. Another important factor that is stringently controlled during nanocrystal growth is the monomer concentration.

The growth process of nanocrystals can occur in two different regimes, "focusing" and "defocusing". At high monomer concentrations, the critical size (the size where nanocrystals neither grow nor shrink) is relatively small, resulting in growth of nearly all particles. In this regime, smaller particles grow faster than large ones (since larger crystals need more atoms to grow than small crystals) resulting in "focusing" of the size distribution to yield nearly monodisperse particles. The size focusing is optimal when the monomer concentration is maintained such that the average nanocrystal size present is always slightly larger than the critical size. When the monomer concentration is depleted during growth, the critical size becomes larger than the average size and the distribution "defocuses".

There are colloidal methods suitable for many different semiconductors, including cadmium selenide, cadmium sulfide, indium arsenide, and indium phosphide. These quantum dots can contain as few as 100 to 100,000 atoms within the quantum dot volume, with a diameter of 10 to 50 atoms. This corresponds to a diameter of about 2 to 10 nm. Larger quantum dots can also be formed, with dimensions in excess of 100 nm.

As has been noted, the spectral response of the quantum dot can be engineered by controlling the geometrical size of the nanocrystal structure. Further control is available by altering quantum dot shape and changing other properties that relate to its quantum confinement potential. As a fluorescing agent in embodiments of the present invention, a particular quantum dot material can be formed and dimensioned so that it fluoresces at a favorable wavelength relative to the incident color light, as was shown for fluorescent dyes in the example of FIGS. 3 and 4. In one embodiment, the same semiconductor material is used in quantum dot form for multiple color channels, with the quantum dots for each color channel formulated and sized appropriately. In an alternate embodiment, quantum dots for different color channels are from different semiconductor materials.

As mentioned earlier, speckle reduction is important to enable high image quality imaging in both digital cinema projection and in consumer projection. In digital cinema applications, the level of acceptable speckle is probably lower than that of the consumer space. In this viewing environment, the room is dark which, in general, opens up the viewer's pupil, lessening the generated speckle to the eye. However, the image quality must be comparatively high so as not to distract from the story. In the consumer space, however, the ambient light levels are likely to be significantly higher, such as in an office environment, or worse outdoor daylight. In this case the viewer's pupil is significantly smaller, increasing the visibility of the laser speckle. While the tolerance of laser speckle under these viewing circumstances are probably higher than that of a movie theatre, the conditions that generate speckle are much worse. One way to assist in improving the consumer viewing experience would be to combine a screen with ambient light rejection along with speckle reduction. Ambient light rejection may be done many ways. One way is to create a surface structure that optically redirect light from directions other than direct on-axis projection away from viewer positions. This can be done by positioning physical lenses or holographic optical elements o on top of the screen.

An alternate embodiment would be to incorporate further dyes or pigments in addition to the fluorescent agents 27. The laser spectrum, as noted earlier, is narrow and it is also desirable to maintain a relatively narrow band of the spectrally broadened speckle reduced light. Therefore, there are significant wavelength bands between the original incident laser illumination wavelength bands and the emissive wavelength bands that are unused by the projection system. Yet ambient light which is relatively broadband is reflected by a conventional screen material. Light absorbing agents, such as dyes or pigments, selected to absorb light in unused visible wavelength bands would significantly benefit the usability of these screens. Preferably, the light absorbing pigments should be selected so that their absorption bands do not substantially overlap with any of the incident laser illumination wavelength bands or any of the emissive visible wavelength bands corresponding to the fluorescent agents 27. The contrast ratio would be substantially enhanced by some elimination of this ambient light. Additionally, speckle visibility would be further reduced by the increase of pupil size accorded with lower ambient light. This increased pupil size has a direct correlation to reduced speckle visibility. The light absorbing agents are preferably distributed over the reflective layer 26 in the same way as the fluorescent agents 27. In one embodiment, the light absorbing agents are included in the same coating layer as the fluorescent agents. In another embodiment light absorbing dots are distributed over the reflective layer together with fluorescent dots 24.

Embodiments that use the method and apparatus of the present invention help to compensate for speckle by conditioning the projection display surface with a fluorescent agent having a low Stokes shift that is preferably within about 25 nm of the peak laser frequency. Advantageously, the projection surface of the present invention can be used with any of a number of types of digital projection apparatus that use laser illumination in one or more color channels. The projection surface 30 can also be advantageously used for speckle reduction in other types of projection systems having narrow bandwidth light sources, including LEDs or visible wavelength super luminescent diodes.

As another aspect and advantage of the present invention, it is recognized that the display surface 30 having sparsely deposited, small Stokes shift, fluorescing agents 27 can also reduce the effects of metameric failure artifacts associated with differences in observer spectral sensitivity. In the field of color science, metamerism is the visual perception of color matching for color stimuli having different spectral power distributions. Said another way, colors are said to be metamers if they appear identical to the human eye even though they have very different spectra. Color imaging system rely on the phenomenon of metamerism to produce color images having the desired color appearance because the reproduced color spectrum will generally not match the color spectrum of an original scene. However, the amounts of the colorants used by the color imaging system can be adjusted to produce a color which will appear to match the original scene color.

The visual phenomenon of metamerism depends on the interaction of the light source spectra with the optical properties of the materials the light reflects from, and the color perception of the observer's eyes. Metameric failure artifacts occur when different observers perceive different colors for the same color stimuli. There are various classifications for metameric failure artifacts, including illuminant metameric failure artifacts (when two material samples have match color appearance when viewed under one light source but not another) and observer metameric failure artifacts (when observer color vision differences cause reporting of different colors or hues).

Laser projection displays, like that of FIG. 1, bring various potential advantages to the field of image projection, including, importantly, a greatly expanded color gamut as compared to other technologies. However, when the color channel spectra are narrowed using lasers (FIG. 12), and the color gamut is expanded, the degree of observer metameric failure artifacts can become more pronounced such that different observers may perceive the displayed colors with significant differences.

Observer metameric failure artifacts can be better understood by considering the 1931 CIE 2° standard observer color matching functions, shown in FIG. 15. These curves depict a representative color perception expectation for the human population, which was derived empirically by color-matching experiments with a small population of observers. The color matching functions (CMFs) of FIG. 15 represent an "average" or "standard" color-normal human observer known as the CIE 1931 standard observer. Although subsequent studies have addressed concerns and deficiencies in the 1931 results, and improved CMFs have been published, the 1931 CMFs of FIG. 15 are still pertinent and are widely used.

However, individual human observers each have their own unique CMFs, which lead to observer to observer differences in color perception. For example, the article "Minimizing observer metamerism in display systems", by Rajeev Ramanath (Color Research & Application, Vol. 34, pp. 391-398, 2009) provides a figure with comparative CMFs for a sampling of modeled observers and individual observers for which data is available from various published studies. The figure shows significant local variations (as much as 5-10%) in color responsivity as a function of wavelength. Ramanath explores the comparative susceptibility to observer metameric failure artifacts when color content is viewed with different electronic display devices, including CRT displays, LCD, DLP and LED based displays, a CCFL (cold cathode fluorescent lamp) based display, and a laser display. Ramanath concludes that observer metameric failure artifacts can occur more frequently as the display spectrum narrows (smaller FWHM) or the number of modes in the display spectrum increases. As a result, the laser display and CCFL display, which have narrow or multi-modal spectra, have the greatest propensity to observer metameric failure artifacts. By comparison, the CRT display and the LED display, which have ~73 nm and ~28 nm bandwidths respectively, exhibit low and medium potentials for observer metameric failure artifacts respectively.

In consideration of Ramanath, it can be seen that the display screen 30 of the present invention, having sparsely deposited, small Stokes shift, fluorescent agents 27 will have the benefit of reducing the degree of observer metameric failure artifacts in addition to reducing speckle artifacts in image content displayed on the screen by a laser projector 10 due to the broadened spectra in the color channels.

Considering again the exemplary fluorescence-broadened green spectra of FIGS. 10 and 11, it is seen that the green fluorescence bands 84 and 94 can broaden the spectra by 40 nm or more. The FIG. 11 green fluorescence band 94, which has a higher relative energy, would be more valuable in reducing the degree of observer metameric failure artifacts observed by viewers 150 of projector 10, as compared to the exemplary fluorescence broadened green spectra of FIG. 10. In a general sense, the broader and stronger (higher intensity) that the fluorescent band becomes; the more the observer metameric failure artifacts will be reduced.

Expanding on this, the exemplary data of FIG. 7 suggests that to obtain the spectral broadening of FIG. 11, which was produced by a screen with an OD 0.3 fluorescent agent coating, that the spectral broadening to reduce observer metameric failure artifacts may exceed that which is desirable for reducing speckle perceptibility. Additionally, the spectral broadening provided by the fluorescent agent 27 will have the effect of reducing the color gamut of the projection system. Therefore, it will generally be necessary to select an optimum fluorescent agent concentration that balances the improvement in the observer metameric failure artifacts with the improvement in the speckle and the reduction in the color gamut. Preferably, a balanced approach is desired, where fluorescence broadening at the screen using fluorescent agents 27 contributes to speckle reduction and observer metameric failure artifact reduction, but without incurring significantly reductions of the projector color gamut.

The results presented in FIGS. 7-14 indicate that a range of fluorescence broadened spectra can be produced depending on the coating parameters. However, as previously noted, these results represent initial experiments using a particular screen material (Hurley MW-16), a particular dye (Rhodamine 6G), and a non-optimized spin coating process. Other combinations of screen materials, fluorescent agents, and coating or patterning processes will yield different results. The selection of the fluorescent agent 27, relative to it Stokes shift $\Delta\lambda s$ and fluorescent bandwidth $\Delta\lambda 2$ will significantly determine the impact on color gamut, speckle reduction, and observer metameric failure artifact reduction. However, these spectral properties can also be effected by the organizational structure imparted to the fluorescent agent 27 by the coating process and the screen surface structure. Additionally, it is noted that coating two or more fluorescing agents 27 for a given color channel (e.g., one with a small positive Stokes shift, and one with a small negative (anti-Stokes) shift) can provide spectral broadening on either side of the primary spectrum, which can expand the spectral broadening to enhance both speckle reduction and observer metameric failure artifact reduction without necessarily changing the concentration or fill factor of the fluorescing agents 27 on the display surface 30. It will be obvious to one of ordinary skill in the art that all of these factors can be co-optimized to balance the impact on color gamut, speckle reduction, and observer metameric failure artifact reduction, as well as to address other system design criteria.

For some applications, the light beam 22 projected by the projection apparatus 10 onto the display surface 30 uses polarized light. For example, many stereoscopic projection systems alternately project light beams in two different orthogonal polarization states. The viewer 150 wears glasses with polarizing filters so that the light of one polarization state is viewed by one eye and the light of the other polarization state is viewed by the other eye. In such cases, it is important that the display screen 30 should preserve the polarization state of the light such that polarization of the return light is substantially the same as the polarization of the incident light. It is well known that display surfaces can be constructed using materials and fabrication techniques that substantially preserve the polarization of the incident light. The present invention can be applied to a projection apparatus 10 that projects a polarized light beam by distributing the fluorescent agent 27 over a reflective layer 26 that is substantially polarization preserving. In this case, it is important that the fluorescent agent 27 or the protective coating 28 not introduce any significant degree of depolarization. Measurements made on the display screen samples described earlier show that they are substantially polarization preserving.

The invention has been described in detail with particular reference to certain preferred embodiments thereof, but it will be understood that variations and modifications can be effected within the spirit and scope of the invention.

PARTS LIST 10 projection apparatus
12r, 12g, 12b spatial light modulator
14 dichroic combiner
16r, 16g, 16b light source
20 projection lens
22 light beam
24 fluorescent dot
25 substrate
26 reflective layer
27 fluorescent agent
28 protective coating
30 display surface
40 wavelength band
42 incident wavelength band
44 emissive wavelength band
46 return light wavelength band
52 measured speckle contrast
54 mean code value
62 measured speckle contrast
64 mean code values
72 green reflection peak
82 green reflection peak
84 green fluorescence band
92 green reflection peak
94 green fluorescence band
102 blue reflection peak
104 green reflection peak
106 red reflection peak
112 blue reflection peak
114 green reflection peak
116 red reflection peak
118 green fluorescence band
122 blue reflection peak
124 green reflection peak
126 red reflection peak
128 green fluorescence band
132 $\bar{z}(\lambda)$ color matching function
134 $\bar{y}(\lambda)$ color matching function
136 $\bar{x}(\lambda)$ color matching function
150 viewer
200 color calibration process flow chart
202 measure spectral response of primaries step 204 calculate colorimetry of primaries step
206 determine primary matrix step
208 determine normalized primary matrix step
210 store normalized primary matrix step
212 determine primary power adjustment factors step
214 adjust primary power levels step
O optical axis
$\lambda 1$, $\lambda 2$ peak wavelength
$\Delta\lambda 1$, $\Delta\lambda 2$ bandwidth
$\Delta\lambda s$ Stokes shift

The invention claimed is:

1. A projection display surface for receiving light from a projector having at least one narrow band light source having an incident visible wavelength band, wherein the incident visible wavelength band has an incident peak wavelength and an incident bandwidth, comprising:
   a) a substrate having a reflective layer that reflects incident light over at least the incident visible wavelength band; and
   b) a fluorescent agent distributed over the reflective layer, wherein the fluorescent agent absorbs a fraction of the light in the incident visible wavelength band and emits light in an emissive visible wavelength band having an emissive peak wavelength and an emissive bandwidth, wherein the fraction of the light in the incident visible wavelength band that is absorbed by the fluorescent agent is between 2% and 40%, and wherein a remaining fraction of the light in the incident visible wavelength band is reflected by the substrate;
   wherein return light from the projection display surface produced when incident light in the incident visible wavelength band is incident on the projection display surface contains both reflected light in the incident visible wavelength band that was not absorbed by the fluorescent agent and was reflected from the substrate and light in the emissive visible wavelength band that was emitted by the fluorescent agent, the reflected light in the incident visible wavelength band being more than 60% of the incident light in the incident visible band.

2. The projection display surface of claim 1 wherein projected images displayed on the projection display surface provide reduced image artifacts relative to projected images formed on a projection display surface that does not include the fluorescent agent.

3. The projection display surface of claim 2 wherein the reduced image artifacts are speckle artifacts or observer metameric failure artifacts.

4. The projection display surface of claim 1 wherein the image artifacts are reduced by the mechanism of spectral broadening.

5. The projection display surface of claim 1 wherein the emissive bandwidth is wider than the incident bandwidth and is at least 5 nanometers in width and no more than 50 nanometers in width.

6. The projection display surface of claim 1 wherein the emissive peak wavelength is shifted relative to the incident peak wavelength.

7. The projection display surface of claim 6 wherein the emissive peak wavelength is shifted by no more than 40 nanometers relative to the incident peak wavelength.

8. The projection display surface of claim 1 wherein the fluorescent agent is a fluorescent dye.

9. The projection display surface of claim 8 wherein the fluorescent dye is rhodamine 6G, Alexa Fluor 532 or BODIPY 530/550.

10. The projection display surface of claim 1 wherein the fluorescent agent is a quantum dot.

11. The projection display surface of claim 10 wherein the quantum dots are fabricated using CdS, CdSe, ZnSe, InAs, GaAs or GaN.

12. The projection display surface of claim 1 wherein the fluorescent agent is uniformly or sparsely distributed on the substrate.

13. The projection display surface of claim 1 wherein an amount of the fluorescent agent distributed over the reflective layer is adjusted to substantially minimize a speckle visibility.

14. The projection display surface of claim 1 wherein the substrate is made of a reflective material, and wherein the reflective layer corresponds to the top surface of the substrate.

15. The projection display surface of claim 1 further including a protective coating layer that protects the projection display surface.

16. The projection display surface of claim 15 wherein the fluorescent agent is included in the protective coating layer.

17. The projection display surface of claim 15 wherein the protective coating layer is applied over the top of the fluorescent agent.

18. The projection display surface of claim 1 wherein the projection display surface is polarization preserving such that polarization of the return light is substantially the same as the polarization of the incident light.

19. The projection display surface of claim 1 wherein the incident light in the incident visible wavelength band and the return light from the projection display have CIE x and y chromaticity coordinates that differ by less than 0.10.

20. The projection display surface of claim 1 further including one or more light absorbing agents distributed over the reflective layer which absorb ambient light in one or more wavelength bands which do not substantially overlap with the incident visible wavelength band or the emissive visible wavelength band.

21. The projection display surface of claim 1 wherein the emissive peak wavelength is longer than the incident peak wavelength, and further including a second fluorescent agent distributed over the reflective layer, wherein the second fluorescent agent absorbs a fraction of the light in the incident visible wavelength band and emits light in a second emissive visible wavelength band having a second emissive peak wavelength and a second emissive bandwidth, the second emissive peak wavelength being shorter than the incident peak wavelength.

22. The projection display surface of claim 1 wherein the projector includes at least a second narrow band light source having a second incident visible wavelength band, wherein the second incident visible wavelength band has a second incident peak wavelength and a second incident bandwidth, and further including at least one additional fluorescent agent that is distributed over the reflective layer, wherein the additional fluorescent agent absorbs a fraction of the light in the second incident visible wavelength band and emits light in a second emissive visible wavelength band having a second emissive peak wavelength and a second emissive bandwidth.

23. The projection display surface of claim 1 wherein the incident bandwidth is less than 5 nm.

24. A projection display surface for reducing image artifacts from a projector having at least one narrow band light source having an incident visible wavelength band, wherein the incident visible wavelength band has an incident peak wavelength and an incident bandwidth, comprising:
   a) a substrate having a reflective layer that reflects incident light over at least the incident visible wavelength band; and
   b) a fluorescent agent that is sparsely distributed on the reflective layer, wherein the sparsely distributed fluorescent agent absorbs between 2% and 40% of the light in the incident visible wavelength band and emits fluorescent light in an emissive visible wavelength band having an emissive peak wavelength and an emissive bandwidth, and wherein a remaining fraction of the light in the incident visible wavelength band is reflected by the substrate;

wherein return light from the projection display surface produced when incident light in the incident visible wavelength band is incident on the projection display surface has a spectrally broadened bandwidth that contains light in both the incident visible wavelength band and the emissive visible wavelength band, thereby reducing image artifacts that are sensitive to a narrow spectral bandwidth.

25. The projection display surface of claim 24 wherein the reflected light in the incident visible wavelength band is more than 60% of the incident light in the incident visible band.

26. The projection display surface of claim 24 wherein the sparsely distributed fluorescent agent is distributed as fluorescent dots that cover between 2% and 40% of the projection display surface.

27. The projection display surface of claim 24 wherein the fraction of the light absorbed by the sparsely distributed fluorescent agent is responsive to both the concentration of the fluorescent agent and the fractional area of the projection display surface provided with the fluorescent agent.

28. The projection display surface of claim 24 wherein the narrow band light source is a laser light source or LED light source.

29. The projection display surface of claim 24 wherein the reduced image artifacts are speckle artifacts or observer metameric failure artifacts.

30. The projection display surface of claim 24 wherein the emissive bandwidth is wider than the incident bandwidth and is at least 5 nanometers in width and no more than 50 nanometers in width.

31. The projection display surface of claim 24 wherein the projection display surface is polarization preserving such that the polarization of the return light is substantially the same as the polarization of the incident light.

32. The projection display surface of claim 24 wherein the incident light in the incident visible wavelength band and the return light from the projection display have CIE x and y chromaticity coordinates that differ by less than 0.10.

* * * * *